(12) United States Patent
Mukae

(10) Patent No.: US 12,246,856 B2
(45) Date of Patent: Mar. 11, 2025

(54) ROCKET LAUNCH ASSISTANCE DEVICE, ROCKET LAUNCH ASSISTANCE SYSTEM, ROCKET LAUNCH ASSISTANCE METHOD, SPACE INFORMATION RECORDER, SPACE TRAFFIC MANAGEMENT DEVICE, AND MEGA-CONSTELLATION BUSINESS DEVICE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 286 days.

(21) Appl. No.: 17/915,100

(22) PCT Filed: May 7, 2021

(86) PCT No.: PCT/JP2021/017584
§ 371 (c)(1),
(2) Date: Sep. 28, 2022

(87) PCT Pub. No.: WO2021/230170
PCT Pub. Date: Nov. 18, 2021

(65) Prior Publication Data
US 2023/0182925 A1    Jun. 15, 2023

(30) Foreign Application Priority Data
May 12, 2020   (JP) .................................. 2020-084115

(51) Int. Cl.
*B64G 1/10*   (2006.01)
*B64G 1/24*   (2006.01)

(52) U.S. Cl.
CPC .......... *B64G 1/1085* (2013.01); *B64G 1/242* (2013.01)

(58) Field of Classification Search
CPC ................. B64G 1/1085; B64G 1/242; B64G 1/2421–2423; B64G 1/2425; B64G 1/2427; B64G 1/2429; B64G 1/244
(Continued)

(56) References Cited

U.S. PATENT DOCUMENTS 6,757,612 B1 *  6/2004  Talent ................... B64G 99/00
                                                                702/3
9,714,101 B1 *  7/2017  Kaplan ................... B64G 1/10
(Continued)

FOREIGN PATENT DOCUMENTS

JP        2017-114159 A      6/2017

OTHER PUBLICATIONS

Dang Changping et al., The Collision Avoidance Strategy of Formation Spacecraft, Aug. 2014, IEEE, pp. 1961-1966.*

(Continued)

*Primary Examiner* — Manglesh M Patel
(74) *Attorney, Agent, or Firm* — XSENSUS, LLP

(57) ABSTRACT

A database (102) of a rocket launch assistance device records orbit forecast information of a mega-constellation satellite group (301) that is acquired from a space information recorder included in a mega-constellation business device and space object information that is acquired from a rocket launch business device. The orbit forecast information of the mega-constellation satellite group (301) is composed of a prediction value of an orbit of at least one representative satellite (331) out of the mega-constellation satellite group (301) and a prediction value of an orbit of a constituent satellite (332), which is a value relative to the prediction value of the orbit of the representative satellite (331).

16 Claims, 31 Drawing Sheets

(58) Field of Classification Search
USPC .................................. 701/301, 531, 32.3, 13
See application file for complete search history.

(56) References Cited

U.S. PATENT DOCUMENTS

| | | | | |
|---|---|---|---|---|
| 11,040,786 | B2* | 6/2021 | Kaen | B64G 1/1085 |
| 11,780,612 | B1* | 10/2023 | Kopardekar | H04W 4/46 |
| | | | | 701/13 |
| 2004/0024527 | A1* | 2/2004 | Patera | G08G 5/045 |
| | | | | 342/29 |
| 2012/0225725 | A1* | 9/2012 | Velasco-Tang | G07F 17/32 |
| | | | | 250/203.1 |
| 2014/0330544 | A1* | 11/2014 | Nikolaev | B64G 3/00 |
| | | | | 703/2 |
| 2018/0370658 | A1 | 12/2018 | Amimoto et al. | |
| 2019/0389602 | A1* | 12/2019 | Schilling | B64G 1/26 |
| 2020/0377234 | A1* | 12/2020 | Catledge | G08G 5/0065 |
| 2024/0150045 | A1* | 5/2024 | Stricklan | G08G 5/045 |

OTHER PUBLICATIONS

Md. Riftabin Kabir et al., A satellite collision avoidance system based on General Regression Neural Network, 2020, IEEE/ACM, pp. 154-160.*
Daniel L. Oltrogge, The "We" Approach to Space Traffic Management, Jun. 2018, SpaceOps Conference, pp. 1-21.*
Sreeja Nag et al., Prototyping operational autonomy for Space Traffic Management, Dec. 2020, Elsevier, pp. 1-18 (pdf).*
Francesco Pinto et al., Towards Automated Satellite Conjunction Management with Bayesian Deep Learning, Dec. 2020, arXiv, pp. 1-7(pdf).*
Dr. Ivan Khrapach, Space Traffic Management: The Growing Challenge of Collision Avoidance, 2024, Space Ambition, pp. 1-10 (pdf).*
NASA, NASA Spacecraft Conjunction Assessment and Collision Avoidance Best Practices Handbook, Oct. 13, 2021, NASA.gov, pp. 1-23 (pdf).*
U.S. Appl. No. 62/904,599, filed Sep. 23, 2019, pp. 1-112 (pdf).*
U.S. Appl. No. 62/854,937, filed May 30, 2019, pp. 1-26 (pdf).*
International Search Report and Written Opinion mailed on Jul. 13, 2021, received for PCT Application PCT/JP2021/017584, filed on May 7, 2021, 8 pages including English Translation.

* cited by examiner

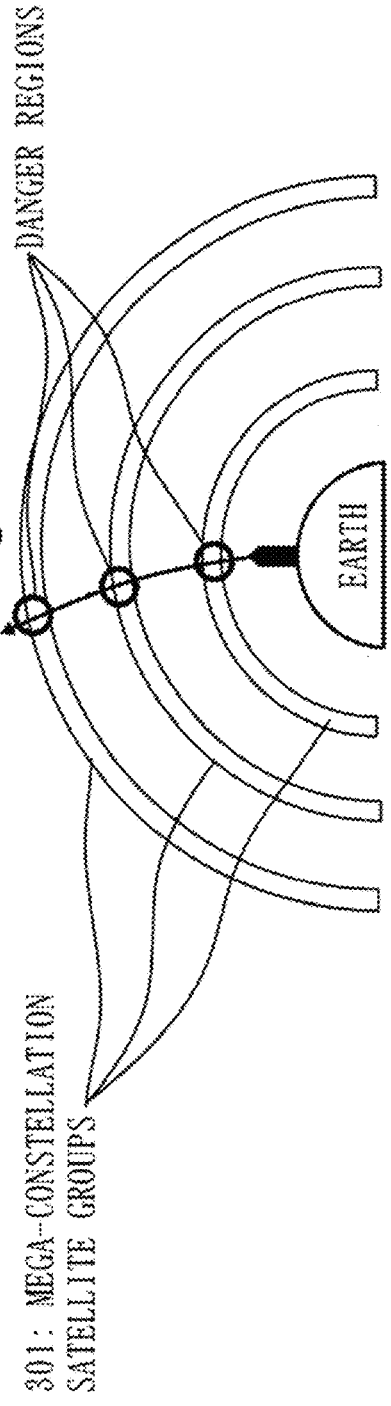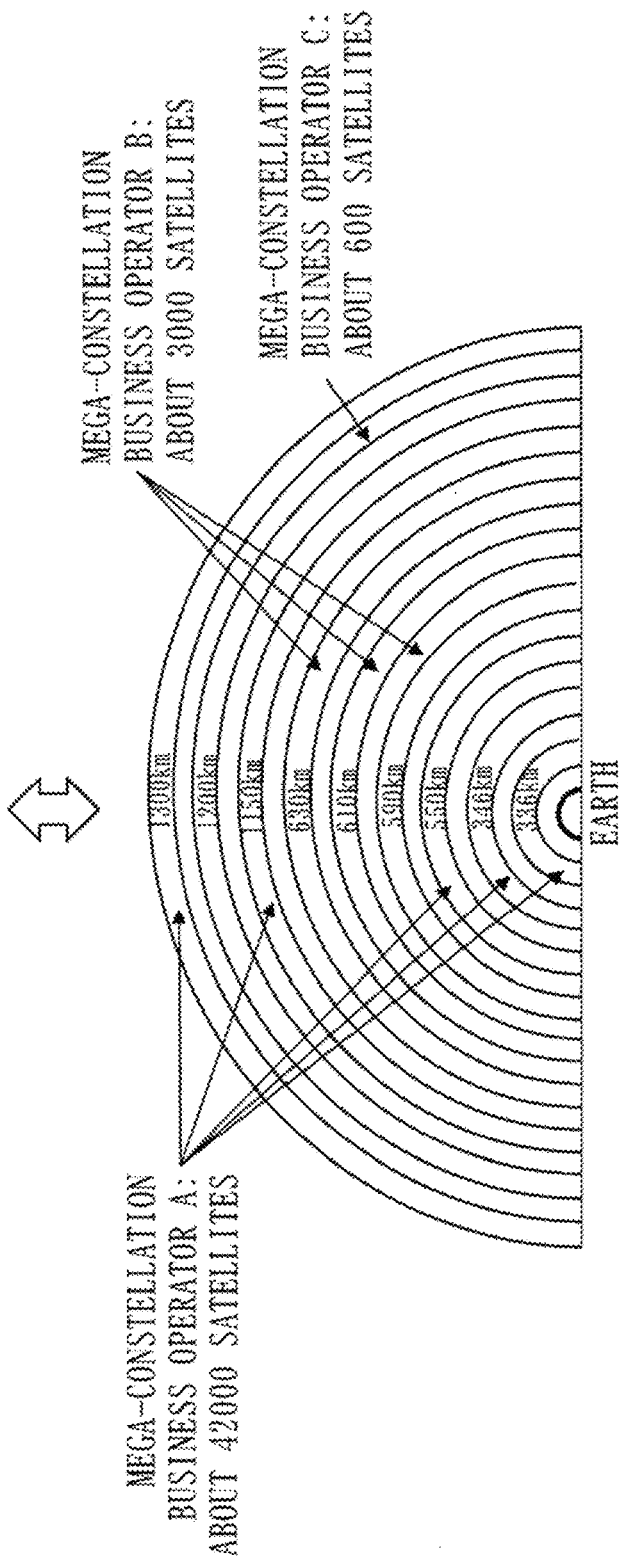
Fig. 9

Fig. 11

511: SPACE OBJECT ID
512: FORECAST EPOCH
513: FORECAST ORBITAL ELEMENTS
514: FORECAST ERROR
51: ORBIT FORECAST INFORMATION

| SATELLITE ID | DEBRIS ID | EPOCH (YEAR AND DATE) | MEAN MOTION (ORBITS/DAY) | SIX KEPLERIAN ELEMENTS ||||| PREDICTED ERROR ||
| | | | | ECCENTRICITY (NO UNIT) | INCLINATION (deg) | RAAN (deg) | ARGUMENT OF PERIGEE (deg) | MEAN ANOMALY (deg) | TRAVEL DIRECTION (km) | ORTHOGONAL DIRECTION (km) |
|---|---|---|---|---|---|---|---|---|---|---|
| A | | a1 | a2 | a3 | a4 | a5 | a6 | a7 | a8 | a9 |
| B | | b1 | b2 | b3 | b4 | b5 | b6 | b7 | b8 | b9 |
| C | | c1 | c2 | c3 | c4 | c5 | c6 | c7 | c8 | c9 |
| D | | d1 | d2 | d3 | d4 | d5 | d6 | d7 | d8 | d9 |
| E | | e1 | e2 | e3 | e4 | e5 | e6 | e7 | e8 | e9 |
| F | | f1 | f2 | f3 | f4 | f5 | f6 | f7 | f8 | f9 |
| | A | α1 | α2 | α3 | α4 | α5 | α6 | α7 | α8 | α9 |
| | B | β1 | β2 | β3 | β4 | β5 | β6 | β7 | β8 | β9 |
| | Γ | γ1 | γ2 | γ3 | γ4 | γ5 | γ6 | γ7 | γ8 | γ9 |
| | Δ | δ1 | δ2 | δ3 | δ4 | δ5 | δ6 | δ7 | δ8 | δ9 |

331: REPRESENTATIVE SATELLITE
301: MEGA-CONSTELLATION-SATELLITE GROUP
332: CONSTITUENT SATELLITES

Fig. 18

DISPLAY EXAMPLE 1 OF
PASSAGE-ALLOWED TIME REGION 111

| MEGA-CONSTELLATION BUSINESS OPERATOR | ORBITAL ALTITUDE | PASSAGE-ALLOWED TIME REGION |
|---|---|---|
| A | 336km | t4-t6, t8-t10 |
| A | 341km | t3-t7 |
| A | 346km | t2-t8 |
| ... | ... | ... |

⇒ INTEGRATION OF PASSAGE-ALLOWED TIME REGIONS 111

DISPLAY EXAMPLE 2 OF
PASSAGE-ALLOWED TIME REGION 111

| MEGA-CONSTELLATION BUSINESS OPERATOR | ORBITAL ALTITUDE | PASSAGE-ALLOWED TIME REGION |
|---|---|---|
| A | 336km, 341km, 346km | t4-t6 |
| ... | ... | ... |

Fig. 19

Display example 3 of passage-allowed time region 111

| MEGA-CONSTELLATION BUSINESS OPERATOR | ORBITAL ALTITUDE | PASSAGE-ALLOWED TIME REGION |
|---|---|---|
| A | 336km, 341km, 346km | t4-t6 |
| B | 590km, 610km, 630km | T5-t8 |
| ... | ... | ... |

ROCKET LAUNCH ASSISTANCE DEVICE, ROCKET LAUNCH ASSISTANCE SYSTEM, ROCKET LAUNCH ASSISTANCE METHOD, SPACE INFORMATION RECORDER, SPACE TRAFFIC MANAGEMENT DEVICE, AND MEGA-CONSTELLATION BUSINESS DEVICE

CROSS-REFERENCE TO RELATED APPLICATIONS

The present application is based on PCT filing PCT/JP2021/017584, filed May 7, 2021, which claims priority to JP 2020-084115, filed May 12, 2020, the entire contents of each are incorporated herein by reference.

TECHNICAL FIELD

The present disclosure relates to a rocket launch assistance device, a rocket launch assistance system, a rocket launch assistance method, a space information recorder, a space traffic management device, a space situational awareness business device, a mega-constellation business device, and an OADR.

BACKGROUND ART

In recent years, large-scale satellite constellations including several hundred to several thousand satellites, which are called mega-constellations, have started to be constructed, and the risk of collision between satellites in orbit is increasing. In addition, space debris such as an artificial satellite that has become uncontrollable due to a failure or rocket debris has been increasing.

With the rapid increase in space objects such as satellites and space debris in outer space as described above, in space traffic management (STM) there is an increasing need to create international rules for avoiding collisions between space objects.

In recent years, mega-constellation business operators that operate mega-constellations have emerged. There is a plan to deploy satellites comprehensively in the sky by the same mega-constellation business operator as indicted below.

Orbital altitude about 336 km: orbital inclination 42 degrees, about 2500 satellites
Orbital altitude about 341 km: orbital inclination 48 degrees, about 2500 satellites
Orbital altitude about 346 km: orbital inclination 53 degrees, about 2500 satellites
Orbital altitude about 550 km: orbital inclination 53 degrees, about 1600 satellites
Orbital altitude about 1150 km: orbital inclination 53 degrees, about 1600 satellites Furthermore, another mega-constellation business operator has announced a plan to deploy a total of 3236 satellites as indicated below. The orbital inclinations are 39 degrees to 56 degrees.

Orbital altitude about 590 km: 784 satellites
Orbital altitude about 610 km: 1296 satellites
Orbital altitude about 630 km: 1156 satellites In addition, for example, there is a concept to build a rocket lift-off site in Taiki town in Hokkaido in Japan at 42 degrees north latitude, for example.

As described above, a plurality of mega-constellation business operators have proposed plans to deploy a large number, as many as several hundreds to several tens of thousands, of satellites comprehensively in the sky. At present, deployment plans have been announced, such as about 42000 satellites by a mega-constellation business operator A, about 3000 satellites by a mega-constellation business operator B, and about 600 satellites by a mega-constellation business operator C.

Patent Literature 1 discloses a technology for forming a satellite constellation composed of a plurality of satellites in the same circular orbit.

CITATION LIST

Patent Literature

Patent Literature 1: JP 2017-114159 A

SUMMARY OF INVENTION

Technical Problem

As a procedure for securing flight safety, it is necessary to first carry out danger analysis such as proximity analysis or collision analysis. However, in order to carry out highly precise danger analysis, high-precision orbit information of space objects is essential.

In order to realize strict passage timing control in a mega-constellation satellite group, each satellite flies while operating a propulsion device moment to moment. For this reason, accurate location information cannot be known unless orbit information is updated in real time. Therefore, real-time high-precision orbit information of several hundreds to several tens of thousands of satellites can only be managed by each mega-constellation business operator that manages each mega-constellation satellite group.

When a rocket is to be launched under such circumstances, it is difficult for a rocket launch business operator to collect all the real-time high-precision orbit information of about 50000 satellites owned by a plurality of mega-constellation business operators and carry out danger analysis. However, Patent Literature 1 does not describe measures for avoiding a collision between a mega-constellation satellite group and a rocket.

An object of the present disclosure is to effectively assist avoidance of a collision between a rocket and each satellite of a mega-constellation satellite group when the rocket is launched.

Solution to Problem

A rocket launch assistance device according to the present disclosure avoids a collision between each satellite of a mega-constellation satellite group constituting a mega-constellation, which is a satellite constellation composed of 100 or more satellites, and a rocket that is launched from a rocket lift-off site, and the rocket launch assistance device includes a database to store orbit forecast information of the mega-constellation satellite group that is acquired from a space information recorder that is included in a mega-constellation business device used by a mega-constellation business operator that manages the mega-constellation, and space object information of the rocket that is acquired from a rocket launch business device used by a rocket launch business operator that launches the rocket and includes location coordinates of the rocket lift-off site, information on a launch scheduled time of the rocket, and a forecast value of orbit information of the rocket; and a server to assist avoidance of a collision between the rocket that is launched from the rocket lift-off site and each satellite of the mega-constellation satellite group passing airspace above the rocket lift-off site, based on the orbit forecast information of the mega-constellation satellite group and the space object information of the rocket, wherein the orbit forecast information of the mega-constellation satellite group is composed of a prediction value of an orbit of at least one representative satellite out of the mega-constellation satellite group flying at a same orbital altitude and a prediction value of an orbit of a constituent satellite other than the representative satellite, the prediction value of the orbit of the constituent satellite being a value relative to the prediction value of the orbit of the representative satellite.

Advantageous Effects of Invention

A rocket launch assistance device according to the present disclosure can effectively assist avoidance of a collision between a rocket and each satellite of a mega-constellation satellite group when the rocket is launched.

BRIEF DESCRIPTION OF DRAWINGS

FIG. 9 is a diagram illustrating a current state of mega-constellation satellite groups and danger regions when a rocket is launched;

FIG. 11 is a diagram illustrating an example of orbit forecast information according to Embodiment 1;

FIG. 18 is a diagram illustrating a display example 1 and a display example 2 of the passage-allowed time region according to Embodiment 1;

FIG. 19 is a diagram illustrating a display example 3 of the passage-allowed time region according to Embodiment 1;

DESCRIPTION OF EMBODIMENTS

Figure 1:
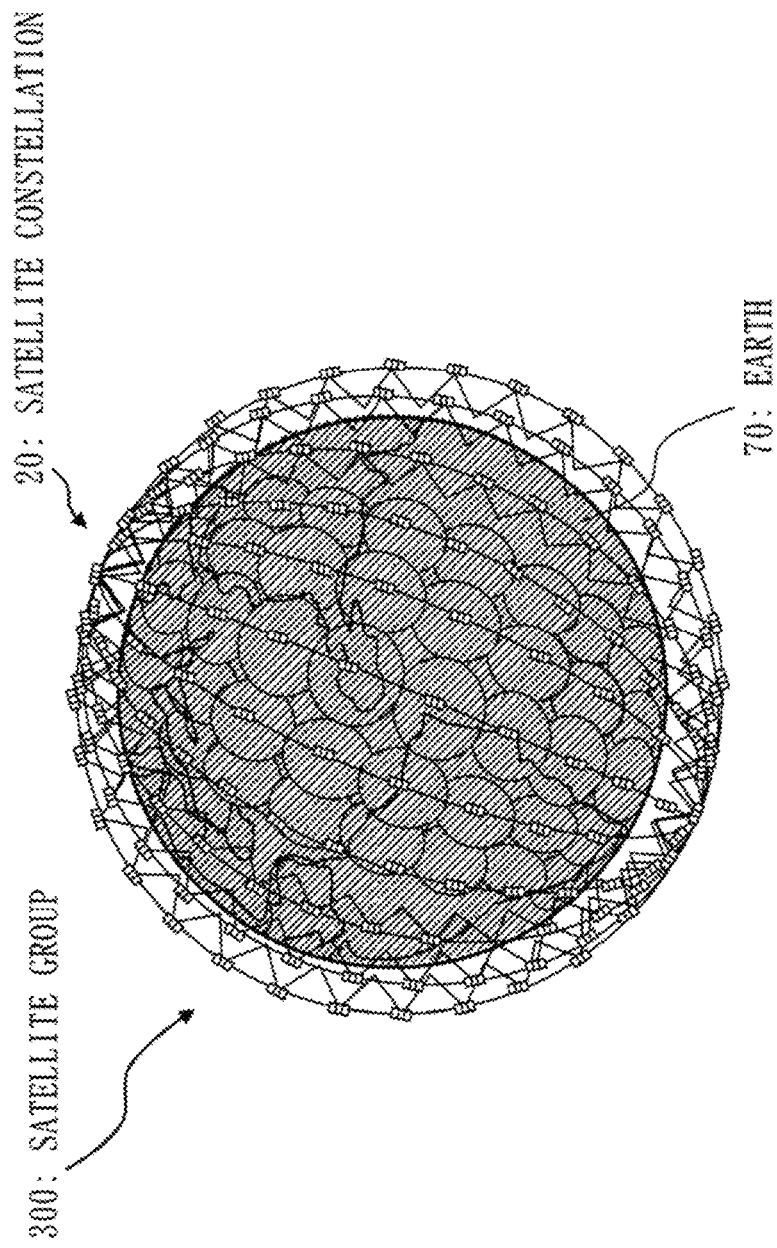
FIG. 1 is an example in which a plurality of satellites cooperatively realize a communication service to the ground over the entire globe of Earth.

Embodiments of the present disclosure will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

Examples of a satellite constellation assumed for the following embodiments will be described.

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner. By providing adjacent orbital planes, a communication service can be provided to the ground with widespread coverage across the adjacent orbits. Similarly, by placing a large number of orbital planes at approximately equal intervals around Earth, a communication service to the ground can be provided over the entire globe.

Figure 2:
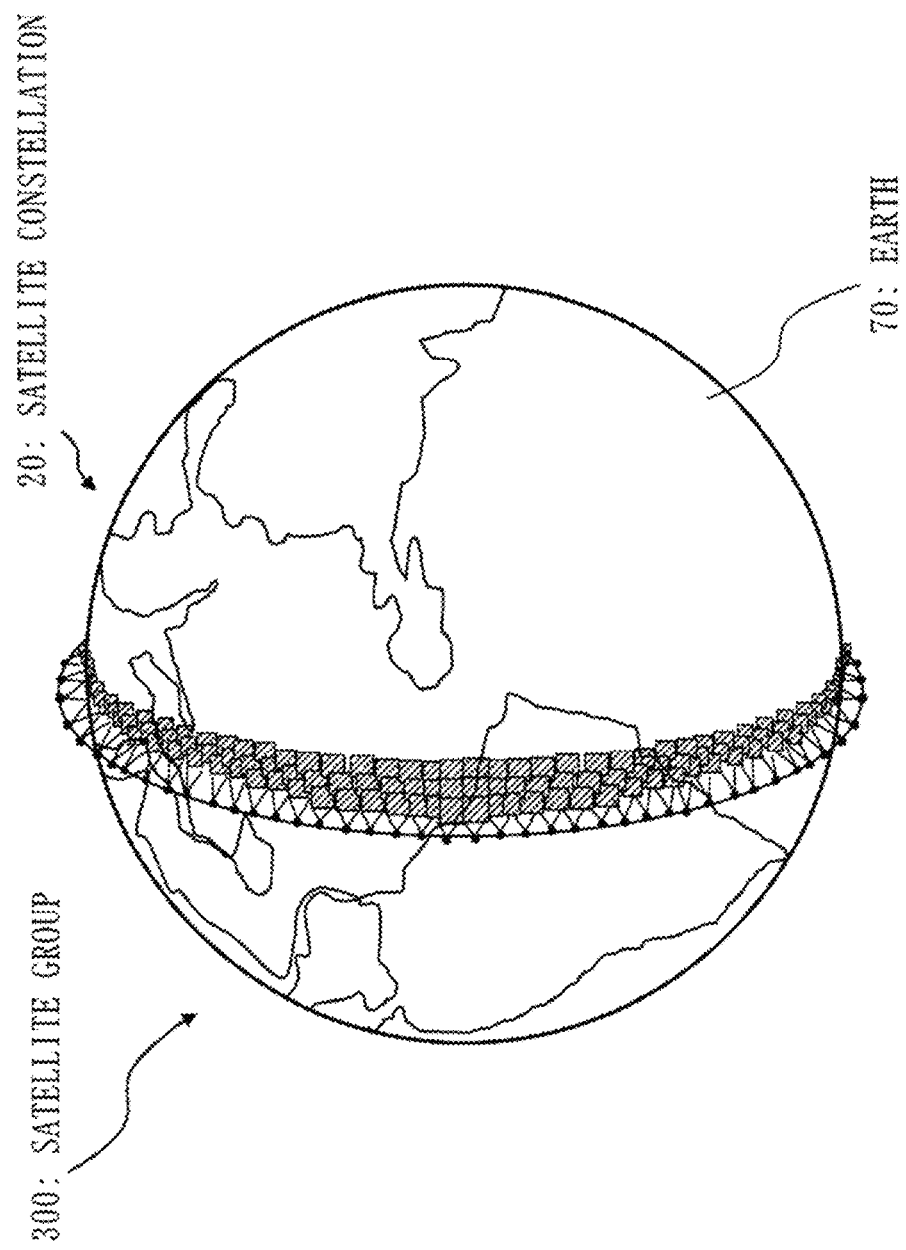
FIG. 2 is an example in which a plurality of satellites in a single orbital plane realize an Earth observation service.

FIG. 2 is a diagram illustrating an example in which a plurality of satellites in a single orbital plane realize an Earth observation service.

FIG. 2 illustrates a satellite constellation 20 that realizes an Earth observation service. In the satellite constellation 20 of FIG. 2, satellites each equipped with an Earth observation device, which is an optical sensor or a radio sensor such as a synthetic-aperture radar, fly at the same altitude in the same orbital plane. In this way, in a satellite group 300 in which the ground imaging ranges of successive satellites overlap in a time-delay manner, a plurality of satellites in orbit provide an Earth observation service by capturing ground images in turn in a time-division manner.

As described above, the satellite constellation 20 is formed with the satellite group 300 composed of a plurality of satellites in each orbital plane. In the satellite constellation 20, the satellite group 300 cooperatively provides a service. Specifically, the satellite constellation 20 refers to a satellite constellation formed with one satellite group by a communications business service company as illustrated in FIG. 1 or an observation business service company as illustrated in FIG. 2.

Figure 3:
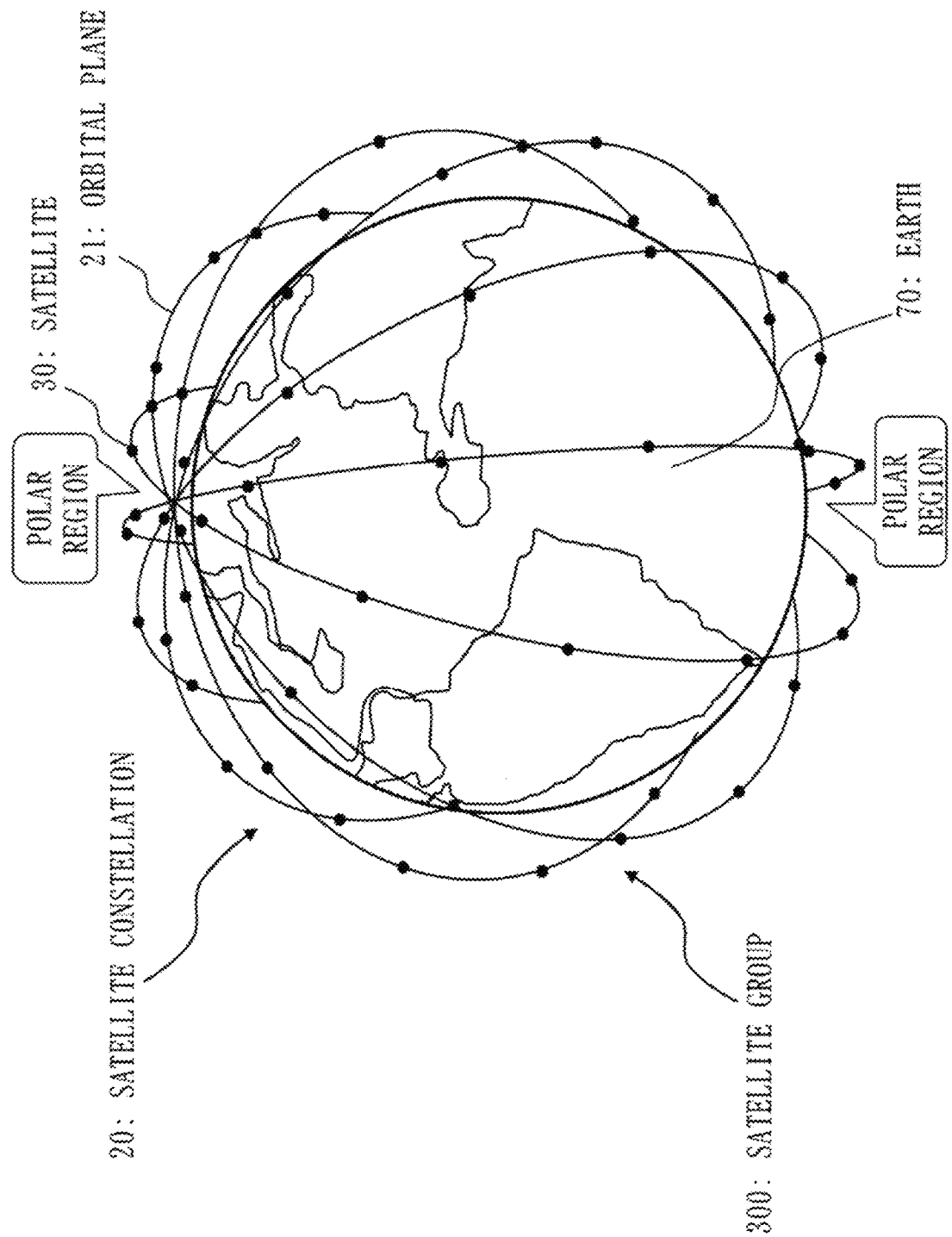
FIG. 3 is an example of a satellite constellation having a plurality of orbital planes that intersect in the vicinity of the polar regions.

FIG. 3 is an example of a satellite constellation 20 having a plurality of orbital planes 21 that intersect in the vicinity of the polar regions.

Figure 4:
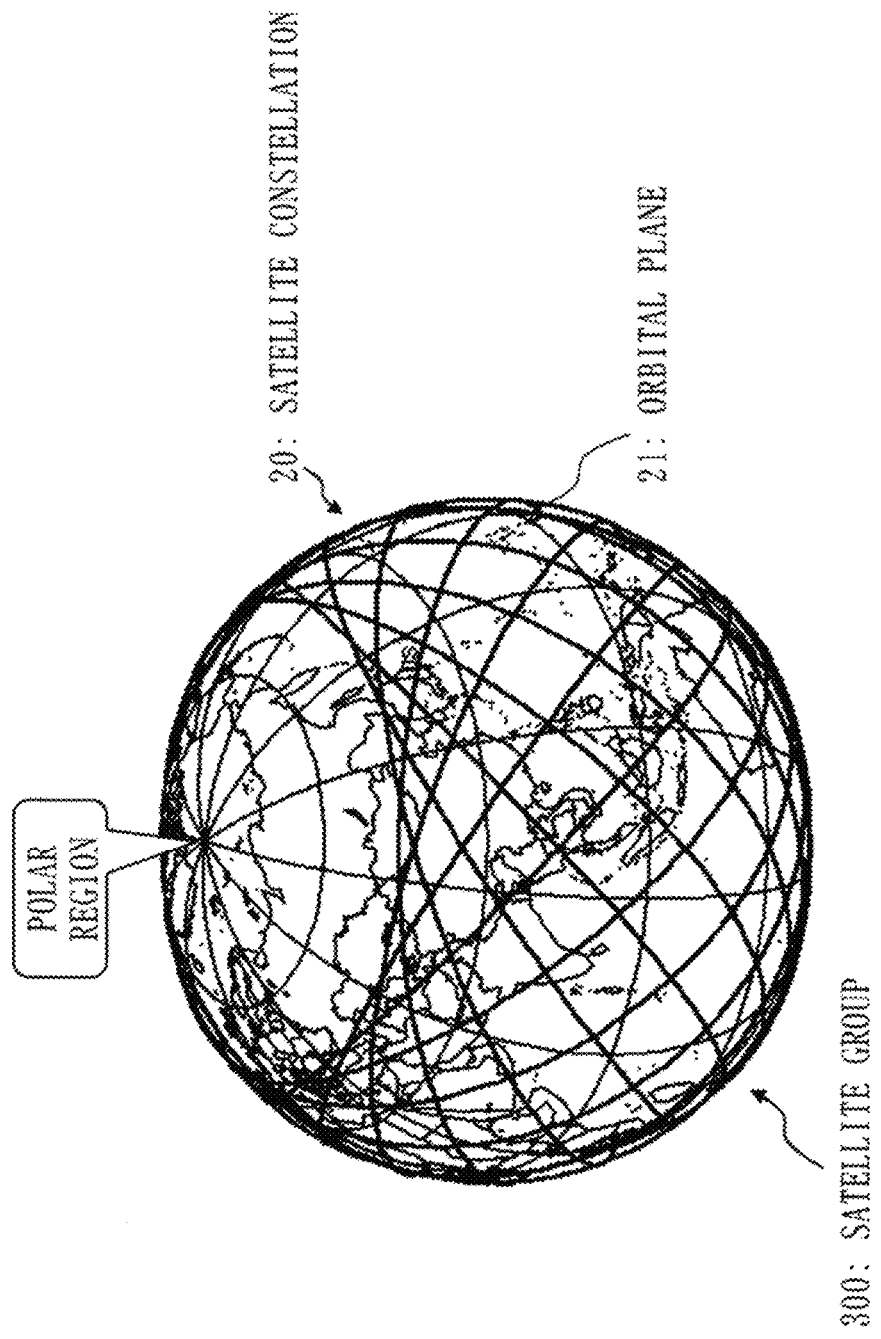
FIG. 4 is an example of a satellite constellation having a plurality of orbital planes that intersect outside the polar regions.

FIG. 4 is an example of a satellite constellation 20 having a plurality of orbital planes 21 that intersect outside the polar regions.

In the satellite constellation 20 of FIG. 3, the orbital inclination of each of the plurality of orbital planes 21 is about 90 degrees, and the orbital planes 21 exist on mutually different planes.

In the satellite constellation 20 of FIG. 4, the orbital inclination of each of the plurality of orbital planes 21 is not about 90 degrees, and the orbital planes 21 exist on mutually different planes.

In the satellite constellation 20 of FIG. 3, any given two orbital planes intersect at points in the vicinity of the polar regions. In the satellite constellation 20 of FIG. 4, any given two orbital planes intersect at points outside the polar regions. In FIG. 3, a collision between satellites 30 may occur in the vicinity of the polar regions. As illustrated in FIG. 4, the intersections between the orbital planes each with an orbital inclination greater than 90 degrees move away from the polar regions according to the orbital inclination. Depending on the combinations of orbital planes, orbital planes may intersect at various locations including the vicinity of the equator. For this reason, places where collisions between satellites 30 may occur are diversified. A satellite 30 is referred to also as an artificial satellite.

In particular, in recent years, large-scale satellite constellations including several hundred to several thousand satellites have started to be constructed, and the risk of collision between satellites in orbit is increasing. In addition, space debris such as an artificial satellite that has become uncontrollable due to a failure or rocket debris has been increasing. In the following description, a large-scale satellite constellation, which is a satellite constellation composed of 100 or more satellites, is referred to also as a mega-constellation. Such debris is referred to also as space debris.

As described above, with the increase in debris in outer space and the rapid increase in the number of satellites such as those in a mega-constellation, the need for STM is increasing. STM is an abbreviation for Space Traffic Management.

Referring to FIGS. 5 to 8, an example of a satellite 30 and a ground facility 700 in a satellite constellation forming system 600 that forms a satellite constellation 20 will be described. For example, the satellite constellation forming system 600 is operated by a business operator that conducts a satellite constellation business, such as a mega-constellation business operator, an LEO constellation business operator, or other types of satellite business operators.

Figure 5:
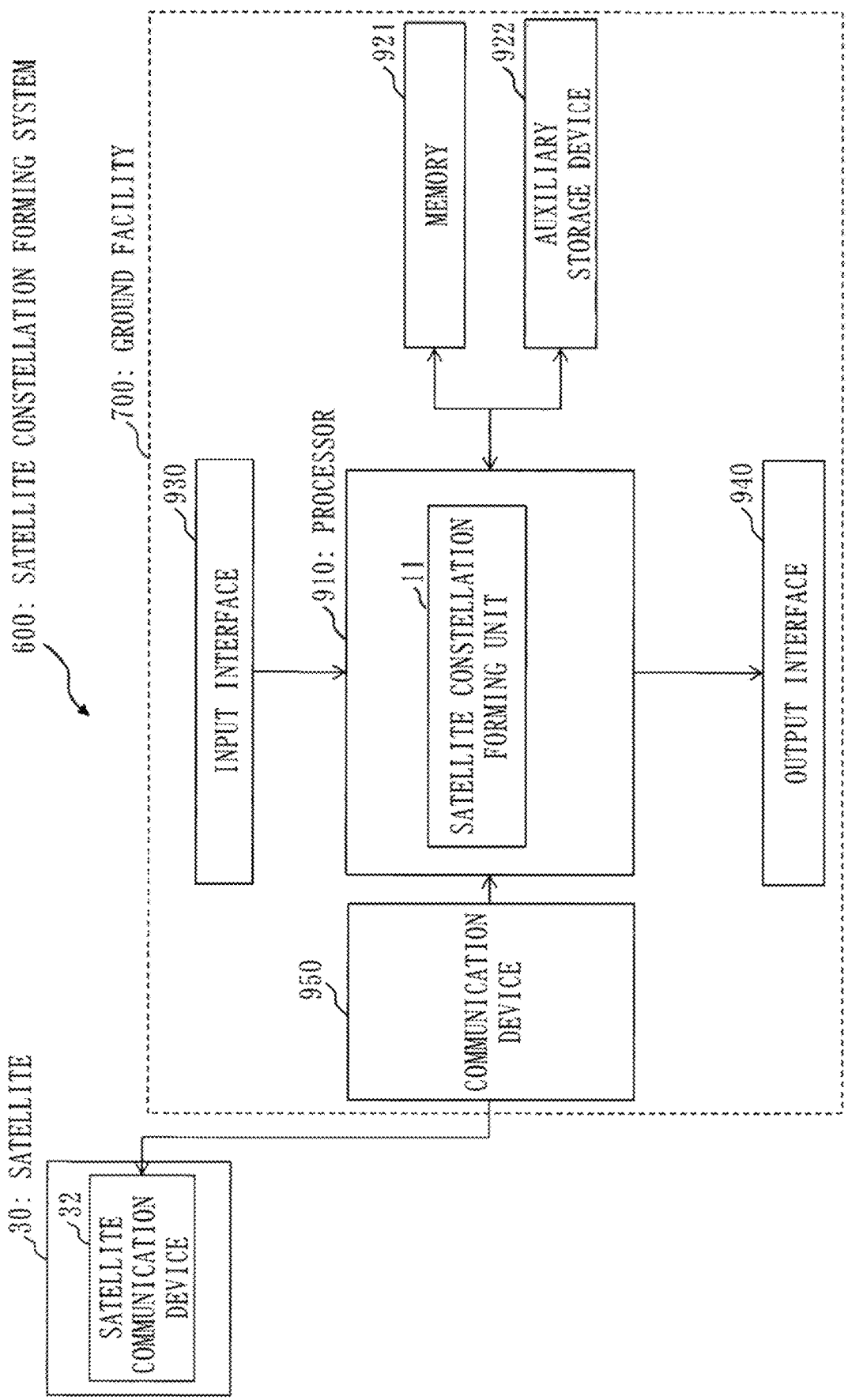
FIG. 5 is a configuration diagram of a satellite constellation forming system.

FIG. 5 is a configuration diagram of the satellite constellation forming system 600.

The satellite constellation forming system 600 includes a computer. FIG. 5 illustrates a configuration with one computer but, in practice, a computer is provided in each satellite 30 of a plurality of satellites constituting the satellite constellation 20 and the ground facility 700 that communicates with each satellite 30. The functions of the satellite constellation forming system 600 are realized cooperatively by the computers provided in each of the satellites 30 and the ground facility 700 that communicates with the satellites 30. In the following, an example of a configuration of the computer that realizes the functions of the satellite constellation forming system 600 will be described.

The satellite constellation forming system 600 includes the satellite 30 and the ground facility 700. The satellite 30 includes a satellite communication device 32 that communicates with a communication device 950 of the ground facility 700. Among the components included in the satellite 30, the satellite communication device 32 is illustrated in FIG. 5.

The satellite constellation forming system 600 includes a processor 910, and also includes other hardware components such as a memory 921, an auxiliary storage device 922, an input interface 930, an output interface 940, and a communication device 950. The processor 910 is connected with other hardware components via signal lines and controls these other hardware components. The hardware of the satellite constellation forming system 600 is substantially the same as the hardware of a rocket launch assistance device 100 to be described later with reference to FIG. 10.

The satellite constellation forming system 600 includes a satellite constellation forming unit 11 as a functional element. The functions of the satellite constellation forming unit 11 are realized by hardware or software.

The satellite constellation forming unit 11 controls formation of the satellite constellation 20 while communicating with the satellite 30.

Figure 6:
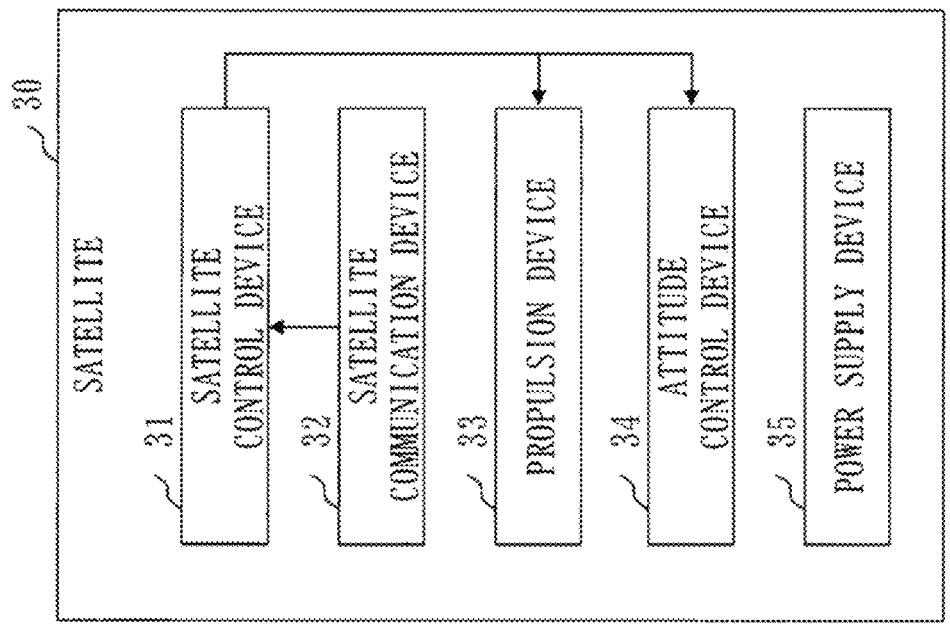
FIG. 6 is a configuration diagram of a satellite of the satellite constellation forming system.

FIG. 6 is a configuration diagram of the satellite 30 of the satellite constellation forming system 600.

The satellite 30 includes a satellite control device 31, the satellite communication device 32, a propulsion device 33, an attitude control device 34, and a power supply device 35. Although other constituent elements that realize various functions are included, the satellite control device 31, the satellite communication device 32, the propulsion device 33, the attitude control device 34, and the power supply device 35 will be described in FIG. 6.

The satellite control device 31 is a computer that controls the propulsion device 33 and the attitude control device 34 and includes a processing circuit. Specifically, the satellite control device 31 controls the propulsion device 33 and the attitude control device 34 in accordance with various commands transmitted from the ground facility 700.

The satellite communication device 32 is a device that communicates with the ground facility 700. Specifically, the satellite communication device 32 transmits various types of data related to the satellite itself to the ground facility 700. The satellite communication device 32 also receives various commands transmitted from the ground facility 700.

The propulsion device 33 is a device that provides thrust force to the satellite 30 to change the velocity of the satellite 30. Specifically, the propulsion device 33 is an electronic propulsion device. Specifically, the propulsion device 33 is an ion engine or a Hall thruster.

The attitude control device 34 is a device to control the attitude of the satellite 30 and attitude elements, such as the angular velocity and the line of sight, of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator in accordance with measurement data of the attitude sensor or various commands from the ground facility 700.

The power supply device 35 includes equipment such as a solar cell, a battery, and an electric power control device, and provides electric power to each piece of equipment installed in the satellite 30.

The processing circuit included in the satellite control device 31 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit. FPGA is an abbreviation for Field Programmable Gate Array.

Figure 7:
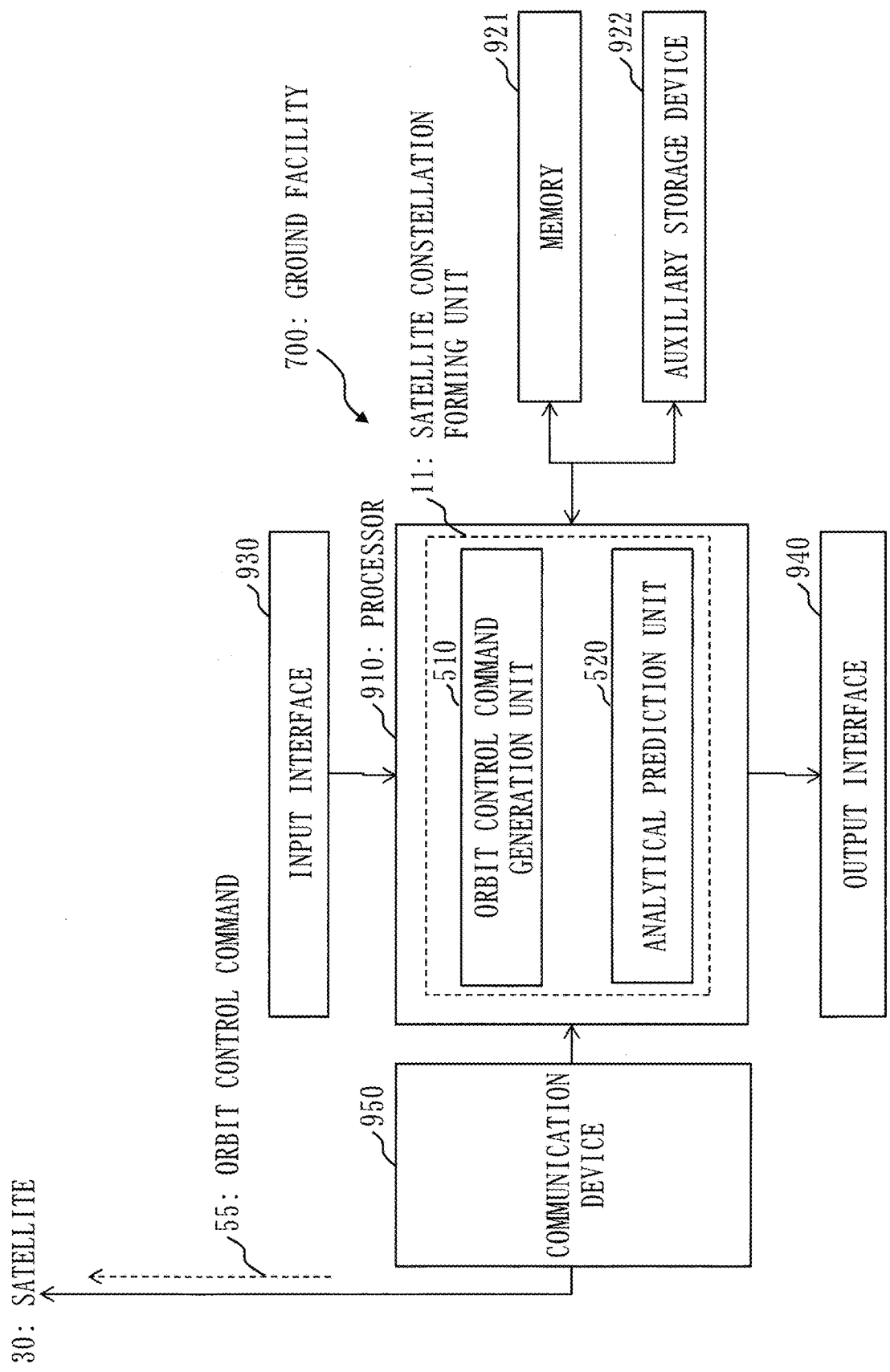
FIG. 7 is a configuration diagram of a ground facility of the satellite constellation forming system.

FIG. 7 is a configuration diagram of the ground facility 700 included in the satellite constellation forming system 600.

The ground facility 700 controls a large number of satellites in all orbital planes by programs. The ground facility 700 is an example of a ground device. The ground device is composed of a ground station, such as a ground antenna device, a communication device connected to a ground antenna device, or an electronic computer, and a ground facility as a server or terminal connected with the ground station via a network. The ground device may include a communication device installed in a mobile object such as an airplane, a self-driving vehicle, or a mobile terminal.

The ground facility 700 forms the satellite constellation 20 by communicating with each satellite 30. The ground facility 700 is provided in the rocket launch assistance device 100. The ground facility 700 includes a processor 910 and also includes other hardware components such as a memory 921, an auxiliary storage device 922, an input interface 930, an output interface 940, and a communication device 950. The processor 910 is connected with other hardware components via signal lines and controls these other hardware components. The hardware components of the ground facility 700 is substantially the same as the hardware components of the rocket launch assistance device 100 to be described later with reference to FIG. 10.

The ground facility 700 includes an orbit control command generation unit 510 and an analytical prediction unit 520 as functional elements. The functions of the orbit control command generation unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 55 to each satellite 30.

The analytical prediction unit 520 performs analytical prediction on the orbit of the satellite 30.

The orbit control command generation unit 510 generates an orbit control command 55 to be transmitted to the satellite 30.

The orbit control command generation unit 510 and the analytical prediction unit 520 realize the functions of the satellite constellation forming unit 11. That is, the orbit control command generation unit 510 and the analytical prediction unit 520 are examples of the satellite constellation forming unit 11.

Figure 8:
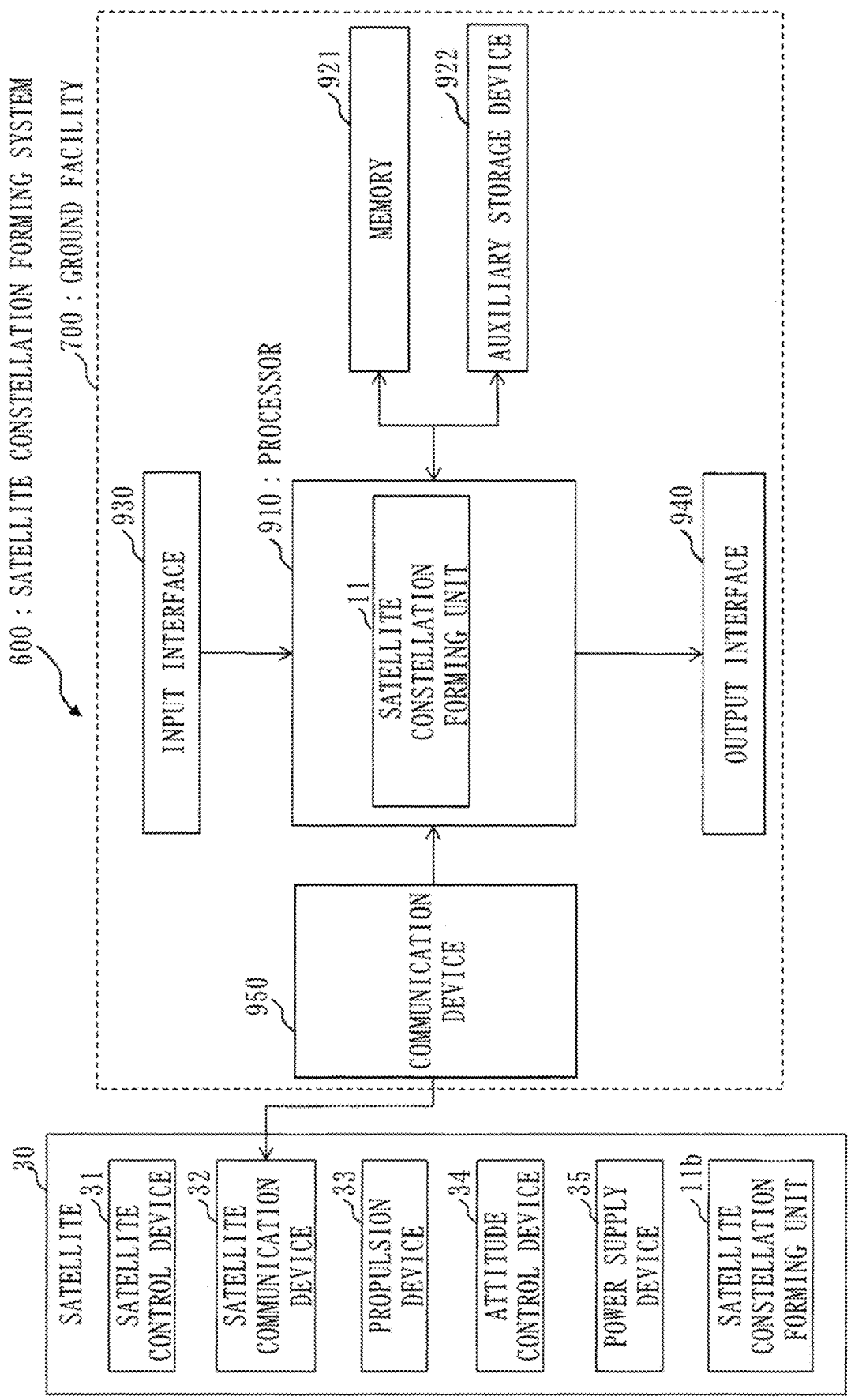
FIG. 8 is an example of a functional configuration of the satellite constellation forming system.

FIG. 8 is a diagram illustrating an example of a functional configuration of the satellite constellation forming system 600.

The satellite 30 further includes a satellite constellation forming unit 11b to form the satellite constellation 20. The functions of the satellite constellation forming system 600 are realized cooperatively by the satellite constellation forming unit 11b included in each satellite 30 of a plurality of satellites and the satellite constellation forming unit 11 included in the ground facility 700. The satellite constellation forming unit 11b of the satellite 30 may be included in the satellite control device 31.

FIG. 9 is a diagram illustrating a current situation of mega-constellation satellite groups and danger regions when a rocket is launched.

Referring to FIG. 9, an overview of functions of the rocket launch assistance device 100 according to this embodiment will be described.

A plurality of mega-constellation business operators have proposed plans to deploy a large number, as many as several hundreds to several tens of thousands, of satellites comprehensively in the sky. At present, deployment plans have been announced, such as about 42000 satellites by a mega-constellation business operator A, about 3000 satellites by a mega-constellation business operator B, and about 600 satellites by a mega-constellation business operator C.

When a rocket is launched to an altitude of 1000 km or higher, it is necessary to pass through altitude regions where many satellite groups of mega-constellation business operators fly. It is necessary to determine an optimum launch timing that does not cause collisions in all the altitude regions.

For example, in order to launch a rocket to an altitude of 1300 km or higher, it is necessary to clear all altitude regions where about 50000 satellites fly. In order to clear all the altitude regions where about 50000 satellites fly, it is necessary to accurately know orbit information of each satellite group of each mega-constellation business operator.

When a satellite group of as many as several thousand satellites fly in the same orbit in a mega-constellation satellite group, if the orbit is a polar orbit with an orbital inclination close to 90 degrees, as illustrated in FIG. 3, the density of satellites is high in the polar regions where all the orbital planes meet. Therefore, it is necessary to strictly control passage timings in the polar regions in order to secure flight safety.

In the case of an inclined orbit with an orbital inclination not close to 90 degrees, as illustrated in FIG. 4, there are collision risks at intersections of orbital planes in mid-latitude regions. Therefore, it is necessary to strictly control passage timings in order to secure flight safety by arranging that satellite passage timings do not coincide at all the intersections in a grid pattern.

In order to realize such strict passage timing control, each satellite group flies while operating propulsion devices moment to moment.

As a procedure for securing flight safety, it is necessary to first carry out danger analysis such as proximity analysis and collision analysis. However, in order to carry out highly precise danger analysis, high-precision orbit information of space objects is essential.

However, as described above, in order to realize strict passage timing control in each mega-constellation satellite group, each satellite group flies while operating propulsion devices moment to moment. For this reason, accurate location information cannot be known unless orbit information is updated in real time. Therefore, it is rational to consider that real-time high-precision orbit information of several hundreds to several tens of thousands of satellites can only be managed by each mega-constellation business operator that manages each mega-constellation satellite group.

When a rocket is to be launched under such circumstances, it is difficult for a rocket launch business operator to collect all the real-time high-precision orbit information of about 50000 satellites owned by a plurality of mega-constellation business operators and carry out danger analysis.

However, it is easy to collect high-precision orbit information of about 1 to 10 representative satellites of each mega-constellation. If the total number of representative satellites of a plurality of mega-constellation business operators is about 100 satellites at most, it is possible to share information among the mega-constellation business operators. Even if real-time high-precision orbit information of about 100 satellites cannot be obtained, it is possible to collect quasi-real-time high-precision orbit information by updating information frequently.

Since a satellite group of many satellites flying in the same orbit strictly controls passage timings, as described above, if real-time high-precision orbit information of a representative satellite can be known, highly precise information can be shared by managing orbit information of other satellites with relative values.

Thus, a mega-constellation business operator frequency updates information on the epoch and high-precision orbital elements of a representative satellite, and then discloses phase differences in the orbital plane and relative angles of the orbital plane of other satellites with respect to the representative satellite as values relative to the representative satellite. With such information, even if the representative satellite operates the propulsion device and the orbit information changes, the relative values of other satellites as a result of strict timing control for preventing collisions within the system are maintained. As a result, therefore, quasi-real-time high-precision orbit information can be known for all the satellites in the mega-constellation satellite group.

Many mega-constellation business operators are in fatalistic collaboration, and if there are mega-constellation business operators at both a higher altitude than the system itself and a lower altitudes than the system itself, it is a shield-and-spear relationship.

In an example in FIG. 9, for each of mega-constellation business operators A, B, and C, there is a satellite group of a different business operator at an altitude higher than its own satellite group and there is a satellite group of a different business operator at an altitude lower than its own satellite group. Therefore, when a rocket is launched in the system of each of the mega-constellation business operators, the rocket will pass through the flight altitude regions of mega-constellation satellite groups. For this reason, an arrangement in which a mega-constellation business operator discloses quasi-real-time high-precision orbit information of its own satellites when another mega-constellation satellite to be launched will pass through the flight region of its own satellite group has a reciprocal aspect, and it is considered that refusal is not possible.

Therefore, with regard to collision avoidance responsibility in a rocket launch or accident liability in the event of a collision, there is no one-sided distinction between a perpetrator and a victim. The relations among the mega-constellation business operators A, B, and C can change at any time. For this reason, unless an arrangement to allow a plurality of mega-constellation business operators to co-exist and co-prosper is created, it will be difficult to ensure the sustainability of mega-constellation businesses.

Description of Configurations

Figure 10:
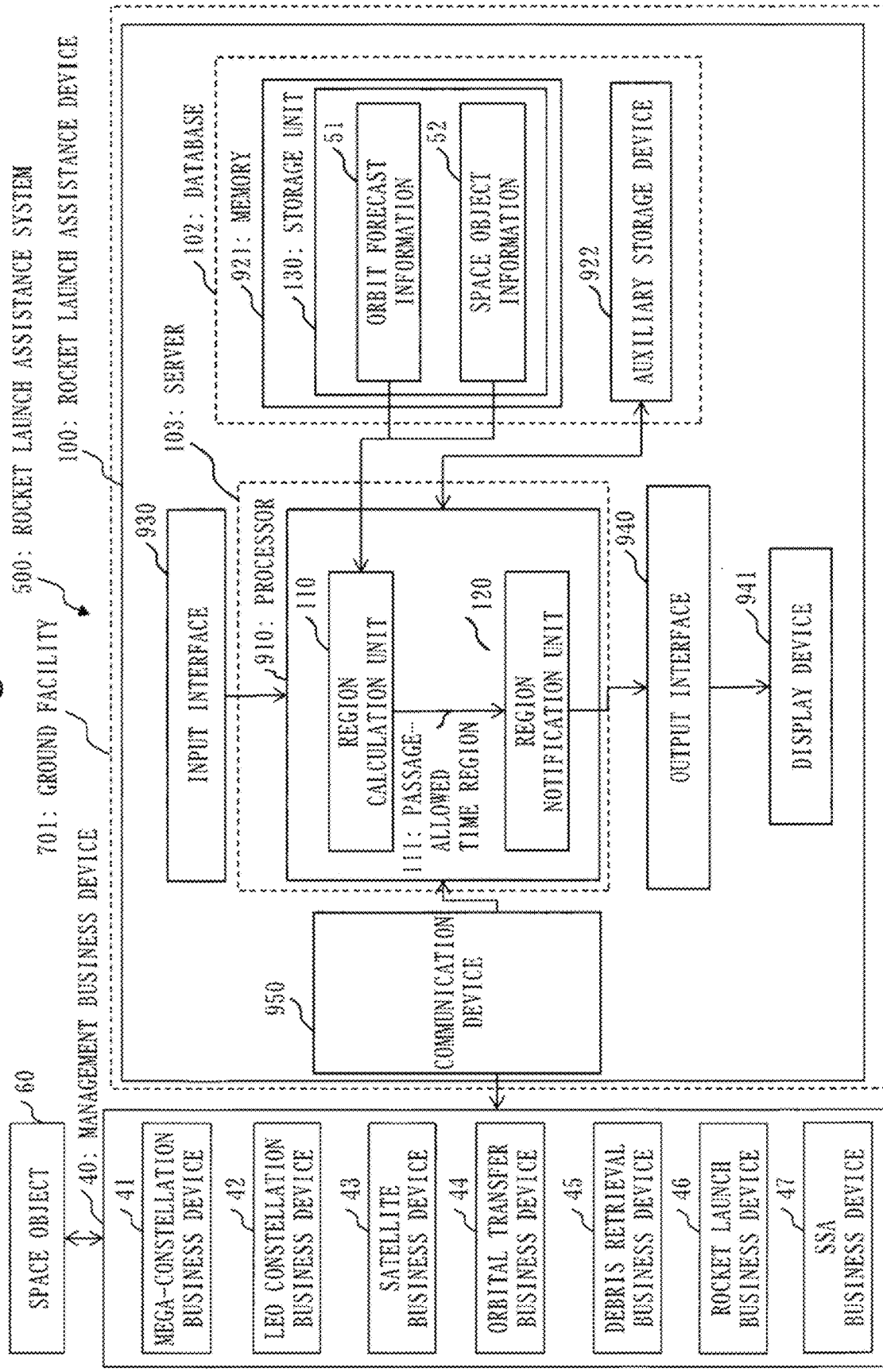
FIG. 10 is a configuration diagram of a rocket launch assistance device according to Embodiment 1.

FIG. 10 is a configuration diagram of the rocket launch assistance device 100 according to this embodiment.

A rocket launch assistance system 500 includes the rocket launch assistance device 100.

The rocket launch assistance device 100 avoids a collision between each satellite of a mega-constellation satellite group and a rocket that is launched from a rocket lift-off site. The mega-constellation satellite group is, for example, a satellite constellation composed of 100 or more satellites.

The rocket launch assistance device 100 communicates with a management business device 40. The rocket launch assistance device 100 is installed in a ground facility 701. Alternatively, the rocket launch assistance device 100 may be installed in the satellite constellation forming system 600. Alternatively, the rocket launch assistance device 100 may be installed in at least one management business device 40 such as a rocket launch business device 46. Alternatively, the rocket launch assistance device 100 may be installed in a device of other business operators such as an orbit analysis business operator.

The management business device 40 provides information on a space object 60 such as an artificial satellite or debris. The management business device 40 is a computer of a business operator that collects information on a space object 60 such as an artificial satellite or debris.

The management business device 40 includes devices such as a mega-constellation business device 41, an LEO constellation business device 42, a satellite business device 43, an orbital transfer business device 44, a debris retrieval business device 45, the rocket launch business device 46, and an SSA business device 47. LEO is an abbreviation for Low Earth Orbit. SSA is an abbreviation for Space Situational Awareness. The SSA business device is referred to also as a space situational awareness business device.

The mega-constellation business device 41 is a computer of a mega-constellation business operator that conducts a mega-constellation business.

The LEO constellation business device 42 is a computer of an LEO constellation business operator that conducts a low Earth orbit constellation, that is, LEO constellation business.

The satellite business device 43 is a computer of a satellite business operator that handles one to several satellites.

The orbital transfer business device 44 is a computer of an orbital transfer business operator that assists a rocket launch for a satellite.

The debris retrieval business device 45 is a computer of a debris retrieval business operator that conducts a business to retrieve debris.

The rocket launch business device 46 is a computer of a rocket launch business operator that conducts a rocket launch business.

The SSA business device 47 is a computer of an SSA business operator that conducts an SSA business, that is, a space situational awareness business.

The management business device 40 may be a device other than the above, provided that it is the device that collects information on a space object such as an artificial satellite or debris, and provides the collected information to the rocket launch assistance device 100. When the rocket launch assistance device 100 is installed on an SSA public server, the rocket launch assistance device 100 may be configured to function as the SSA public server.

The information provided from the management business device 40 to the rocket launch assistance device 100 will be described in detail later.

The rocket launch assistance device 100 includes a processor 910 and also includes other hardware components such as a memory 921, an auxiliary storage device 922, an input interface 930, an output interface 940, and a communication device 950. The processor 910 is connected with other hardware components via signal lines and controls these other hardware components.

The rocket launch assistance device 100 may be configured to include a server 103 and a database 102. For example, the processor 910 is an example of the server 103. For example, the memory 921 and the auxiliary storage device 922 are examples of the database 102. The server 103 may include the input interface 930, the output interface 940, and the communication device 950.

The rocket launch assistance device 100 includes, as functional elements, a region calculation unit 110, a region notification unit 120, and a storage unit 130.

The storage unit 130 of the database 102 stores the orbit forecast information 51 of a mega-constellation satellite group that is acquired from a space information recorder included in the mega-constellation business device 41 used by the mega-constellation business operator. The storage unit 130 also stores space object information 52 of a rocket that is acquired from the rocket launch business device 46 used by the rocket launch business operator. The space object information 52 of the rocket includes location coordinates of a rocket lift-off site, launch scheduled time information of the rocket, and forecast values of orbit information of the rocket.

The server 103 assists avoidance of a collision between the rocket that is launched from the rocket lift-off site and each satellite of the mega-constellation satellite group that passes over the rocket lift-off site, based on the orbit forecast information 51 of the mega-constellation satellite group and the space object information 52 of the rocket.

The functions of the region calculation unit 110 and the region notification unit 120 are realized by software. The storage unit 130 is provided in the memory 921. Alternatively, the storage unit 130 may be provided in the auxiliary storage device 922. The storage unit 130 may be divided and provided in the memory 921 and the auxiliary storage device 922.

The processor 910 is a device that executes a rocket launch assistance program. The rocket launch assistance program is a program that realizes the functions of the region calculation unit 110 and the region notification unit 120.

The processor 910 is an integrated circuit (IC) that performs operational processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital.

CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of a display device 941, such as a display, is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC). The rocket launch assistance device 100 communicates with the management business device 40 via the communication device 950.

The rocket launch assistance program is read into the processor 910 and executed by the processor 910. The memory 921 stores not only the rocket launch assistance program but also an operating system (OS). The processor 910 executes the rocket launch assistance program while executing the OS. The rocket launch assistance program and the OS may be stored in the auxiliary storage device 922. The rocket launch assistance program and the OS that are stored in the auxiliary storage device 922 are loaded into the memory 921 and executed by the processor 910. Part or the entirety of the rocket launch assistance program may be embedded in the OS.

The rocket launch assistance device 100 may include a plurality of processors as an alternative to the processor 910. These processors share the execution of programs. Each of the processors is, like the processor 910, a device that executes programs.

Data, information, signal values, and variable values that are used, processed, or output by programs are stored in the memory 921 or the auxiliary storage device 922, or stored in a register or a cache memory in the processor 910.

"Unit" of each unit of the rocket launch assistance system may be interpreted as "process", "procedure", "means", "phase", or "step". "Process" of a region calculation process and a region notification process may be interpreted as "program", "program product", or "computer readable recording medium recording a program".

The rocket launch assistance program causes a computer to execute each process, each procedure, each means, each phase, or each step, where "unit" of each unit of the rocket launch assistance system is interpreted as "process", "procedure", "means", "phase", or "step". A rocket launch assistance method is a method performed by execution of the rocket launch assistance program by the rocket launch assistance device 100.

The rocket launch assistance program may be stored and provided in a computer readable recording medium. Alternatively, each program may be provided as a program product.

Description of Operation

FIG. 11 is a diagram illustrating an example of the orbit forecast information 51 according to this embodiment.

The rocket launch assistance device 100 stores, in the storage unit 130, the orbit forecast information 51 in which forecast values of orbits of space objects 60 are set. For example, the rocket launch assistance device 100 may acquire forecast values of the orbit of each of the space objects 60 from the management business device 40 used by a management business operator that manages the space objects 60 and store them as the orbit forecast information 51. Alternatively, the rocket launch assistance device 100 may acquire the orbit forecast information 51 in which forecast values of the orbit of each of the space objects 60 are set from the management business operator and store it in the storage unit 130.

The management business operator is a business operator that manages the space objects 60 that fly in outer space, such as a satellite constellation, various types of satellites, a rocket, and debris. As described above, the management business device 40 used by each management business operator is a computer, such as the mega-constellation business device 41, the LEO constellation business device 42, the satellite business device 43, the orbital transfer business device 44, the debris retrieval business device 45, the rocket launch business device 46, and the SSA business device 47.

In the orbit forecast information 51, information such as a space object identifier (ID) 511, a forecast epoch 512, forecast orbital elements 513, and a forecast error 514 is set, for example.

The space object ID 511 is an identifier that identifies a space object 60. In FIG. 11, a satellite ID and a debris ID are set as the space object ID 511. Specifically, a space object is an object such as a rocket to be launched into outer space, an artificial satellite, a space station, a debris retrieval satellite, a planetary space probe, or a satellite or rocket that has become debris after completing a mission.

The forecast epoch 512 is an epoch that is forecast for the orbit of each of the space objects.

The forecast orbital elements 513 are orbital elements that identify the orbit of each of the space objects. The forecast orbital elements 513 are orbital elements that are forecast for the orbit of each of the space objects. In FIG. 11, the six Keplerian elements are set as the forecast orbital elements 513.

The forecast error 514 is an error that is forecast for the orbit of each of the space objects. In the forecast error 514, a travel direction error and an orthogonal direction error are set. The forecast error 514 explicitly indicates the amount of error included in a record value.

In the orbit forecast information 51 according to this embodiment, the forecast epoch 512 and the forecast orbital elements 513 are set for the space object 60. Using the forecast epoch 512 and the forecast orbital elements 513, the time and location coordinates of the space object 60 in the near future can be obtained. For example, the time and location coordinates of the space object 60 in the near future may be set in the orbit forecast information 51.

The orbit forecast information 51 thus includes information on the orbit of each space object including the epoch and orbital elements or the time and location coordinates, and explicitly indicates forecast values of the space object 60 in the near future. The configuration of the orbit forecast information 51 may be different from the configuration of FIG. 11, provided that it is information in which forecast values of the space object 60 in the near future are explicitly indicated.

With regard to the forecast values of the orbit information of the rocket included in the space object information 52, forecast values of the rocket in the near future are explicitly indicated according to substantially the same configuration as that of the orbit forecast information 51.

In FIG. 11, satellites A, B, . . . , and F with satellite IDs A, B, . . . , and F are satellites of a mega-constellation satellite group 301.

A representative satellite 331 is at least one satellite that is selected from the mega-constellation satellite group 301 flying at the same orbital altitude. In FIG. 11, the satellite A is the representative satellite 331.

Constituent satellites 332 are satellites other than the representative satellite 331 in the mega-constellation satellite group 301. Therefore, in FIG. 11, the satellites B, . . . , and F are the constituent satellites 332.

In this embodiment, the orbit forecast information 51 of the mega-constellation satellite group 301 is composed of prediction values of the orbit of the representative satellite 331 and prediction values of the orbits of the constituent satellites 332 other than the representative satellite 331. The prediction values of the orbit of the representative satellite 331 are real-time high-precision orbit information. The prediction values of the orbits of the constituent satellites 332 other than the representative satellite 331 are values relative to the prediction values of the orbit of the representative satellite 331. The prediction values of the orbits of the constituent satellites 332 are values relative to the prediction values of the orbit of the representative satellite 331 and are referred to also as quasi-real-time high-precision orbit information.

In FIG. 11, the orbit forecast information 51 of the satellites B, . . . , and F other than the satellite A, which is the representative satellite 331, is represented as values relative to the orbit forecast information of the representative satellite 331.

Figure 12:
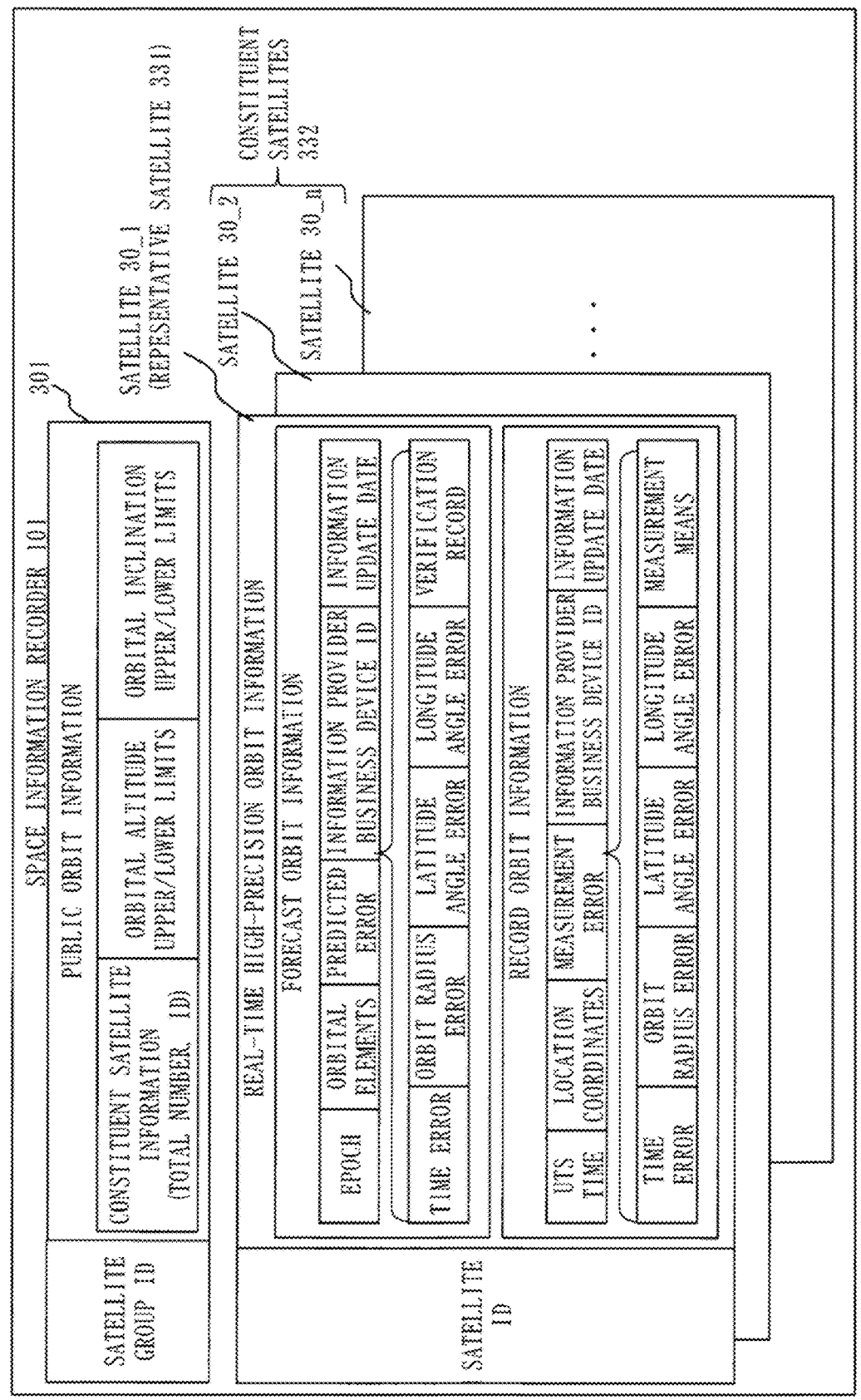
FIG. 12 is an example of a space information recorder of a mega-constellation business device according to Embodiment 1.

FIG. 12 is a diagram illustrating an example of a space information recorder 101 of the mega-constellation business device 41 according to this embodiment.

The space information recorder 101 of the mega-constellation business device 41 records orbit information of satellites constituting a mega-constellation. The orbit information includes forecast orbit information and record orbit information. A specific example of the forecast orbit information of the space information recorder 101 is a configuration that is substantially the same as the orbit forecast information 51 of FIG. 10.

The space information recorder 101 includes public orbit information associated with a satellite group ID that identifies the mega-constellation satellite group 301 and real-time high-precision orbit information associated with a satellite ID that identifies each satellite included in the satellite group.

The public orbit information is orbit information that can be disclosed to other business devices. In the public orbit information, constituent satellite information, such as the number of satellites constituting the satellite group and satellite IDs, upper and lower limits of the orbital altitude of the satellite group, and the upper and lower limits of the orbital inclination of the satellite group are set.

In the real-time high-precision orbit information, forecast orbit information and record orbit information are set in association with each satellite ID. The forecast orbit information and the record orbit information are set such that they are real-time and highly precise.

In this embodiment, the orbit forecast information 51 of the mega-constellation satellite group 301 is composed of the prediction values of the orbit of the representative satellite 331 and the prediction values of the orbits of the constituent satellites 332 other than the representative satellite 331. The prediction values of the orbits of the constituent satellites 332 other than the representative satellite 331 are values relative to the prediction values of the orbit of the representative satellite 331.

The representative satellite 331 is at least one satellite selected from the mega-constellation satellite group 301 flying at the same orbital altitude.

The constituent satellites 332 are satellites other than the representative satellite 331 in the mega-constellation satellite group 301.

In FIG. 12, a satellite 30_1 is the representative satellite 331 as an example. The constituent satellites 332 other than the satellite 30_1 are a satellite 30_2, ..., and a satellite 30_n. Note that n is a natural number indicating the number of satellites constituting the mega-constellation satellite group 301.

In this case, the forecast orbit information of the satellite 30_2, ..., and the satellite 30_n other than the representative satellite 331 may be represented as values relative to the forecast orbit information of the representative satellite 331.

As described above, with the rocket launch assistance device 100 according to this embodiment, there is an effect that if real-time high-precision orbit information of the representative satellite 331 can be known, orbit information of other satellites can be managed with relative values, so that highly precise information sharing is possible.

In addition, with the rocket launch assistance device 100 according to this embodiment, there is an effect that it is possible for a single business operator to know quasi-real-time high-precision orbit information of all satellites that are managed by a plurality of mega-constellation business operators. Therefore, with the rocket launch assistance device 100 according to this embodiment, there is an effect that a rocket can be launched while securing flight safety.

Figure 13:
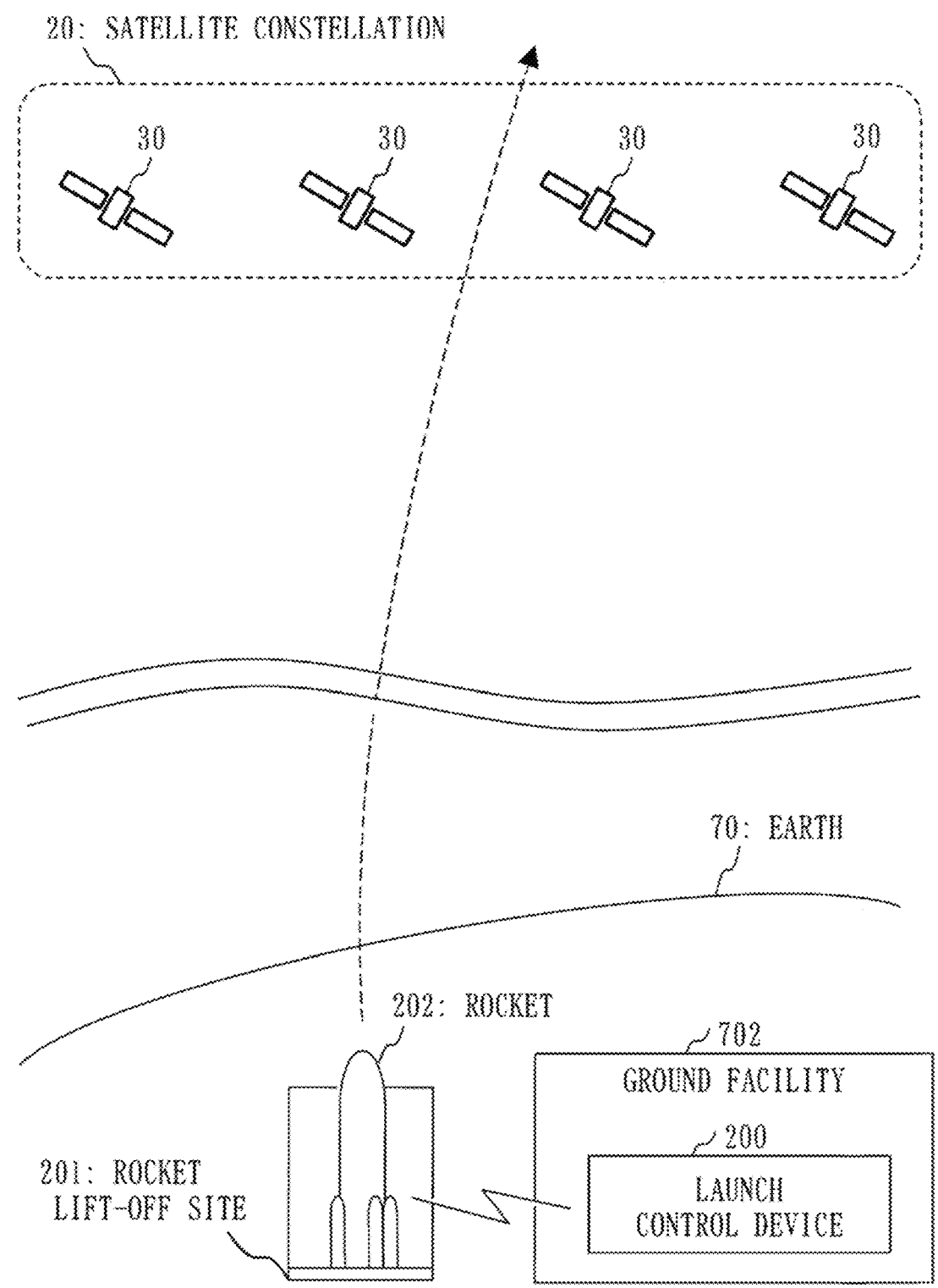
FIG. 13 is a diagram depicting a rocket launch according to Embodiment 1.

FIG. 13 is a diagram depicting a rocket launch according to this embodiment.

A rocket 202 is launched from a rocket lift-off site 201 by control from a launch control device 200. The launch control device 200 is installed in a ground facility 702, for example.

The rocket launch assistance device 100 according to this embodiment assists a launch of the rocket 202 so that the rocket 202 is launched without colliding with a satellite 30 of a satellite constellation 20 flying in airspace above the rocket lift-off site 201.

Figure 14:
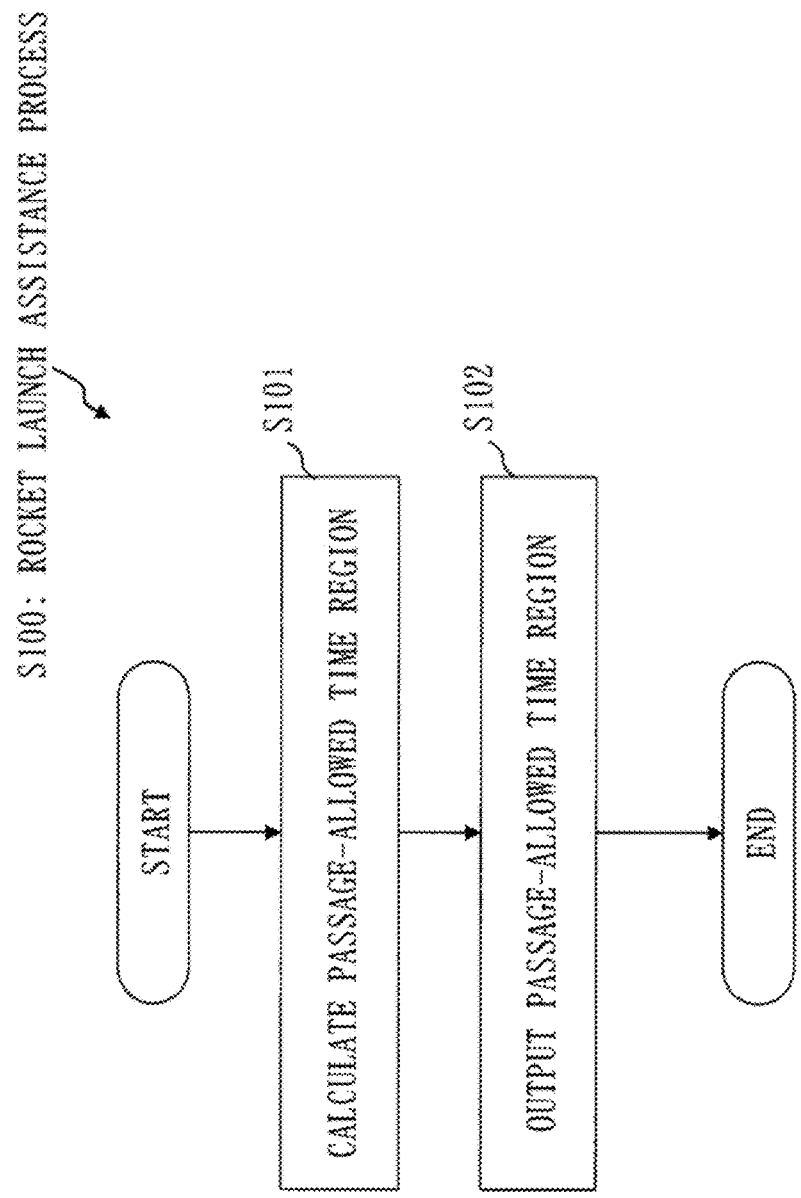
FIG. 14 is a flowchart of a rocket launch assistance process by the rocket launch assistance device according to Embodiment 1.

FIG. 14 is a flowchart of a rocket launch assistance process S100 by the rocket launch assistance device 100 according to this embodiment.

In step S101, the region calculation unit 110 calculates a passage-allowed time region 111 based on the location coordinates of the rocket lift-off site 201 and the orbit forecast information 51 in which forecast values of the orbits of satellites are set. The passage-allowed time region 111 is a time region in which there is no risk that the rocket 202 that is launched from the rocket lift-off site 201 may collide with satellites 30 of the satellite constellation 20 passing airspace above the rocket lift-off site 201. In other words, the passage-allowed time region 111 is the time region in which there is no risk that the rocket 202 that is launched from the rocket lift-off site 201 whose location coordinates are fixed and known may collide with satellites 30 of the satellite constellation 20 formed at a specific altitude.

Figure 15:
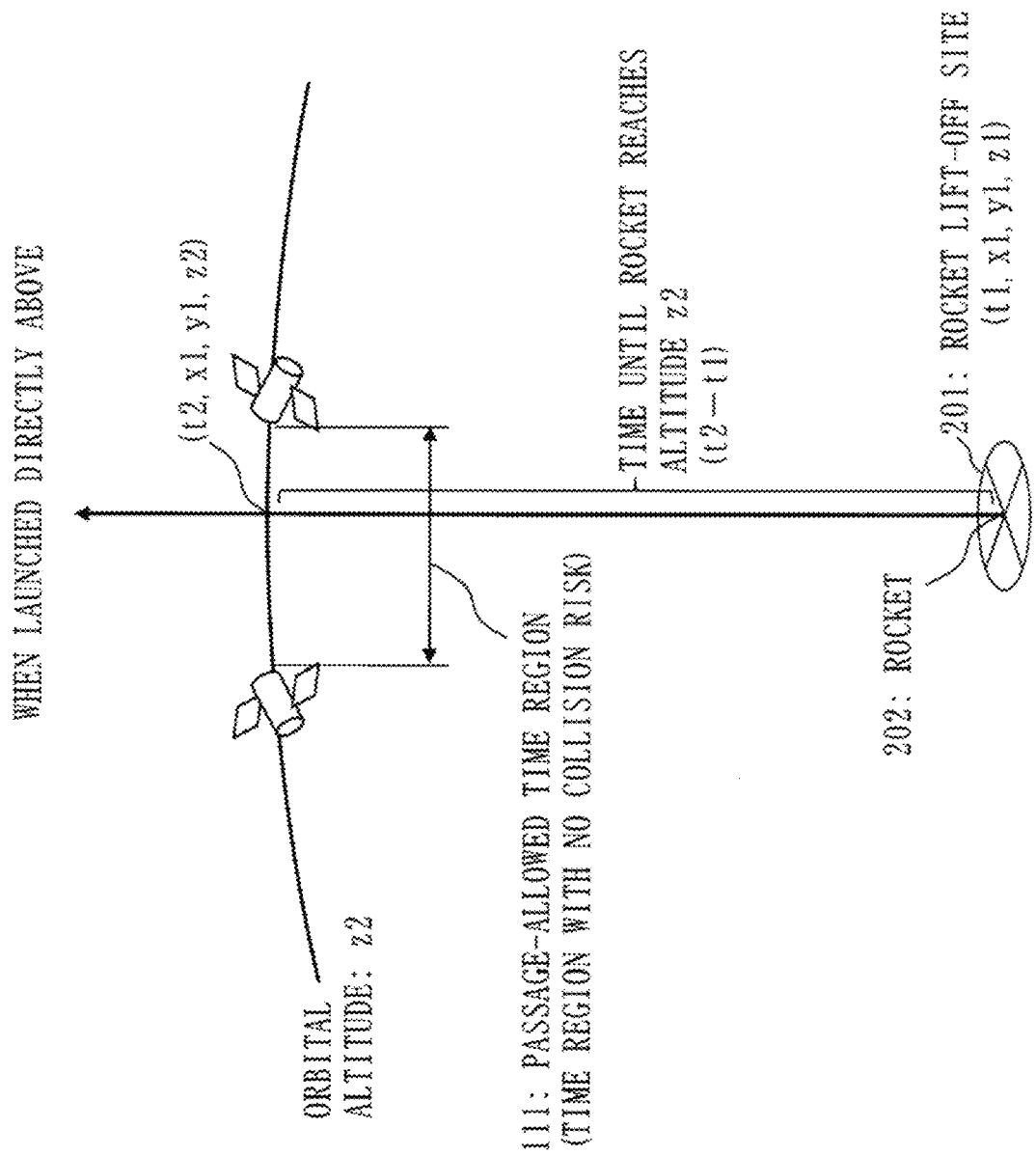
FIG. 15 is a diagram illustrating an example in which a rocket is launched directly above according to Embodiment 1.

FIG. 15 is a diagram illustrating an example in which the rocket 202 is launched directly above according to this embodiment.

For example, it is assumed that there is a mega-constellation A that is formed at an orbital altitude of about 336 km and an orbital inclination of 42 degrees and is composed of about 2500 satellites. It is assumed that the rocket 202 is launched directly above from the rocket lift-off site 201 that is built in Taiki town in Hokkaido located at 42 degrees north latitude and 143 degrees east longitude. In this case, the rocket 202 has a risk of colliding with a satellite 30 of the mega-constellation A at an altitude of 336 km. However, satellites flying in the same orbital plane are operated with an inter-satellite space of approximately 100 km or more. Therefore, there is a re-arrival wait time of 10 seconds or more from passage of one satellite in airspace above until passage of a next satellite.

Satellites in an adjacent orbital plane also operate with a similar inter-satellite space, and operational control is performed so the satellites pass 42 degrees north latitude at timings that fill gaps between satellites in order to avoid collisions with satellites in a different orbital plane in airspace in the vicinity of 42 degrees north latitude.

The region calculation unit 110 takes into account the time required to reach an altitude of 336 km after the rocket is launched, and excludes a time period in which satellites happen to pass airspace above as a "time period with a collision risk". The region calculation unit 110 may calculate, for example, a time period obtained by excluding the "time period with a collision risk" from the hours of a day as the passage-allowed time region 111. Alternatively, the region calculation unit 110 may calculate, as the passage-allowed time region 111, a time period obtained by excluding the "time period with a collision risk" from a time period specified by a user. In this way, as a result of excluding the "time period with a collision risk" of each satellite in the orbital plane passing the vicinity of airspace above the rocket lift-off site 201 from the time period concerned, a "time region with no collision risk", that is, the passage-allowed time region 111 remains. If the time until reaching the specific altitude after the launch is used as a collateral condition and this information is disclosed to the rocket launch business operator of the rocket lift-off site, the rocket can be launched with no collision risk.

Figure 16:
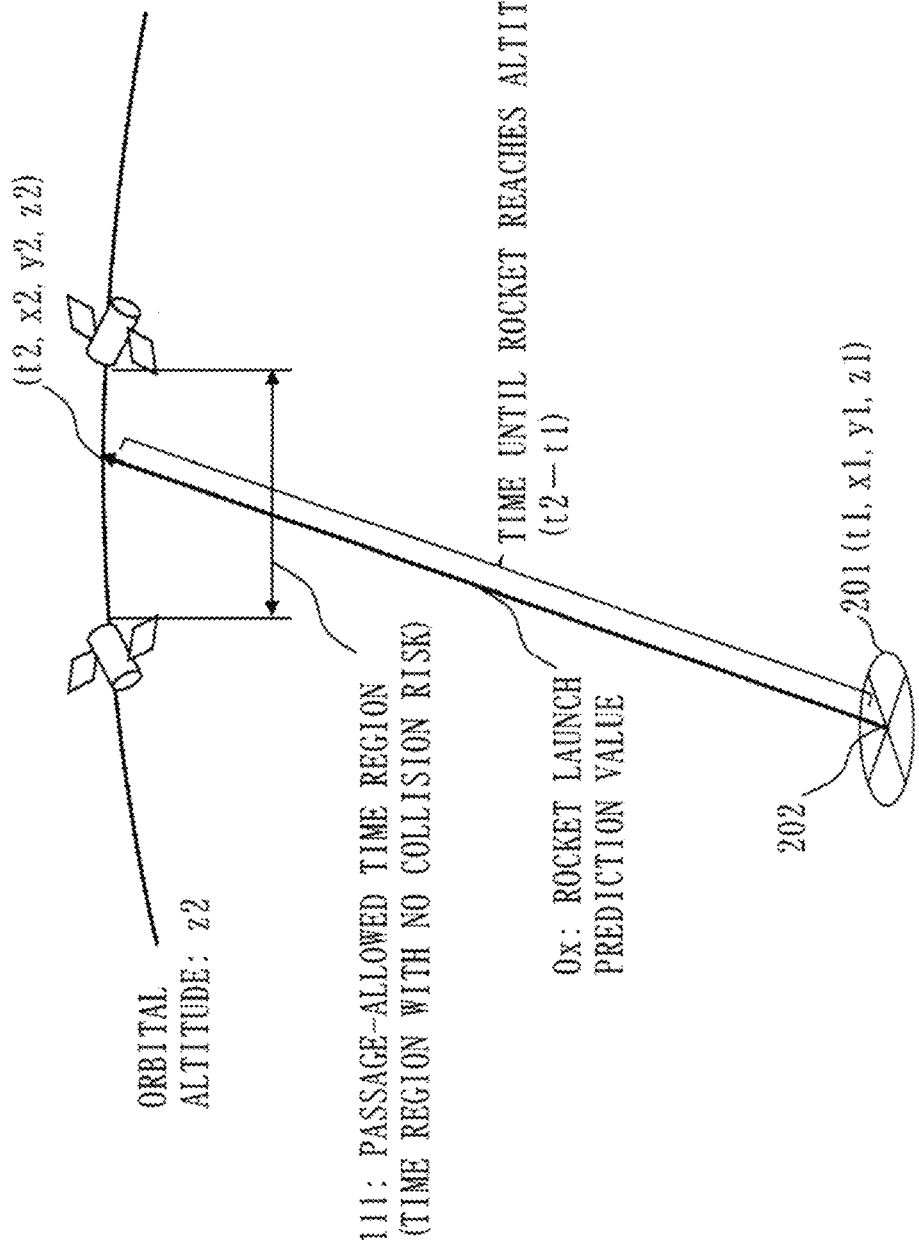
FIG. 16 is a diagram illustrating an example in which a rocket is launched in an oblique direction according to Embodiment 1.

FIG. 16 is a diagram illustrating an example in which the rocket 202 is launched in an oblique direction according to this embodiment.

The rocket 202 is not necessarily launched directly above. For example, the region calculation unit 110 may acquire a rocket launch prediction value Ox, which is a predicted rocket launch trajectory, from the rocket launch business operator in advance. The region calculation unit 110 calculates the passage-allowed time region 111 based on the rocket launch prediction value Ox and the orbit forecast information 51. Specifically, the rocket launch prediction value Ox includes a desired passage time and passage location coordinates at a specific altitude, for example, an altitude of 336 km. The reason for "desired passage" is that the launch control device 200 needs to adjust the launch timing according to the "time region with no collision risk".

As described above, the region calculation unit 110 acquires the rocket launch prediction value Ox of passage of the orbit of the satellite constellation 20 by the rocket 202 launched from the rocket lift-off site 201. The region calculation unit 110 may calculate the passage-allowed time region 111 using the rocket launch prediction value Ox acquired from the rocket launch business operator.

Figure 17:
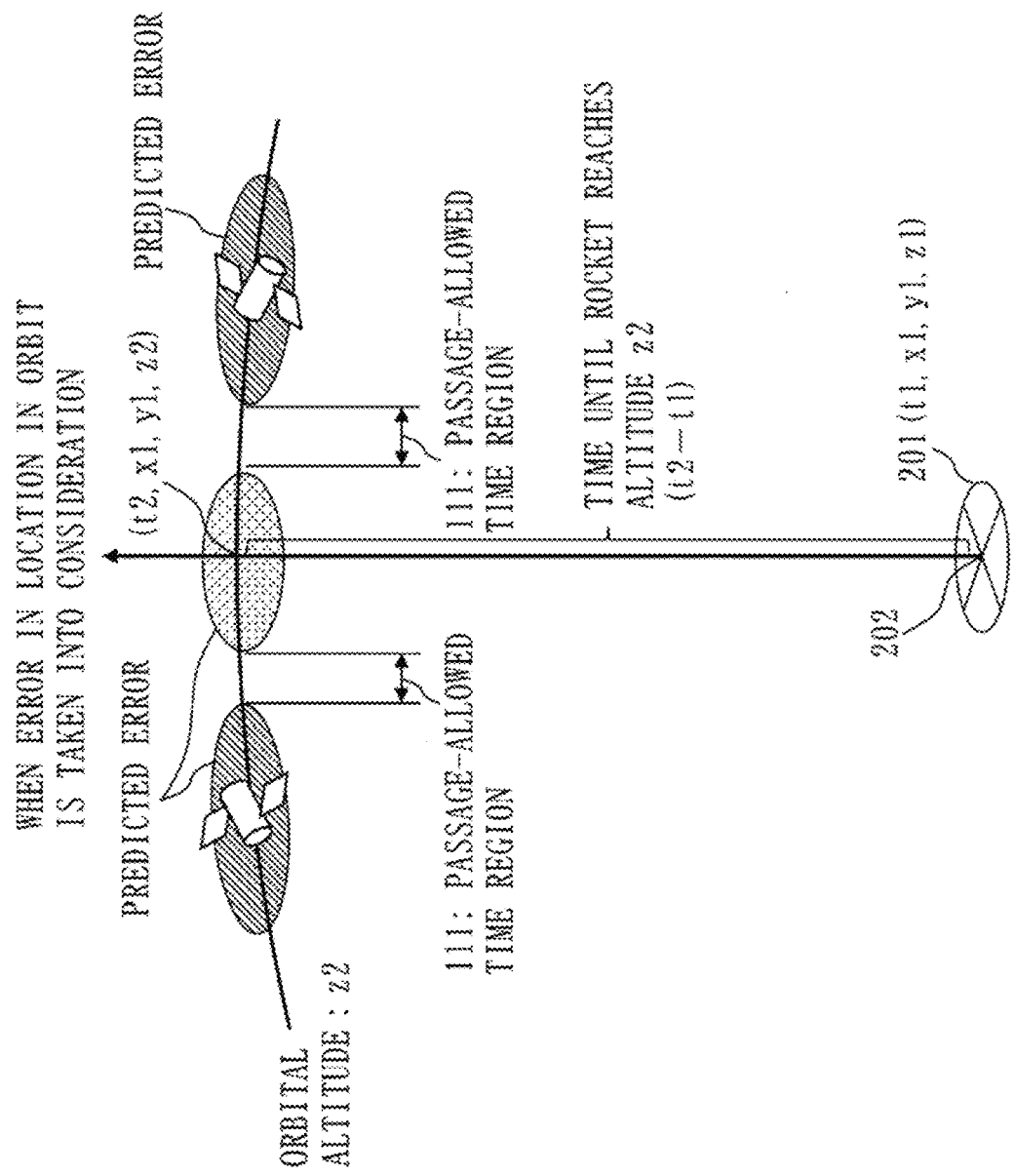
FIG. 17 is a diagram illustrating an example of a passage-allowed time region that makes an allowance for a prediction error according to Embodiment 1.

FIG. 17 is a diagram illustrating an example of the passage-allowed time region 111 that makes an allowance for a prediction error according to this embodiment.

For example, a significant prediction error may be included in the location coordinates of passage of an altitude of 336 km on the rocket launch business operator side. Alternatively, a significant prediction error may be included in the satellite passage time and location coordinates on the mega-constellation business operator side. FIG. 17 implies that there is a concern that if there is a prediction error such as described above, a time region with no collision risk, that is, the passage-allowed time region 111 may not exist, and that a safe rocket launch cannot be performed unless precision is improved.

In step S102, the region notification unit 120 outputs the passage-allowed time region 111. Specifically, the region notification unit 120 displays the passage-allowed time region 111 on the display device 941 via the output interface 940. Alternatively, the region notification unit 120 may transmit the passage-allowed time region 111 to the management business device 40 via the communication device 950.

The satellite constellation 20 may be a plurality of satellite constellations formed at a plurality of orbital altitudes that are mutually different. For example, these satellite constellations may belong to a specific mega-constellation business operator. The region calculation unit 110 calculates the passage-allowed time region 111 for each of the plurality of orbital altitudes. The region notification unit 120 displays a time region obtained by integrating the passage-allowed time regions 111 calculated for the plurality of orbital altitudes on the display device.

FIG. 18 is a diagram illustrating a display example 1 and a display example 2 of the passage-allowed time region 111 according to this embodiment.

As illustrated in the display example 1 of FIG. 18, the passage-allowed time region 111, which is a time region with no collision risk, may be displayed for each of a plurality of orbital altitudes operated by a specific mega-constellation business operator.

For example, three types of mega-constellations that are formed in the vicinity of an orbital altitude of 340 km operate asynchronously with each other. Therefore, movements of orbital planes as seen from specific location coordinates of the rocket lift-off site or flight locations of satellites are uncorrelated for each orbital altitude. For this reason, even if the rocket launch assistance device 100 displays the passage-allowed time region 111 for each of the orbital planes, it is only a necessary condition and is not a sufficient condition for a "time region with no collision risk in all orbits".

For example, it is assumed that the following satellite constellations 20 exist.

Orbital altitude about 336 km: orbital inclination 42 degrees, about 2500 satellites
Orbital altitude about 341 km: orbital inclination 48 degrees, about 2500 satellites
Orbital altitude about 346 km: orbital inclination 53 degrees, about 2500 satellites In the rocket launch assistance device 100 according to this embodiment, "time regions with no collision risk", that is, the passage-allowed time regions 111 of the above three altitudes and some or all orbital altitudes operated by the same mega-constellation business operator are integrated. Then, as illustrated in the display example 2 of FIG. 18, a "time region with no collision risk in a plurality of orbits" is displayed as the passage-allowed time region 111. As a result, the rocket launch business operator can safely perform a launch without colliding with any of the satellites operated by the mega-constellation business operator concerned.

The satellite constellation 20 may be a plurality of satellite constellations operated by mutually different satellite constellation business operators. In this case, the region calculation unit 110 calculates the passage-allowed time region 111 for each of the plurality of satellite constellations. Then, the region notification unit 120 displays the passage-allowed time region 111 for each of the plurality of satellite constellations.

FIG. 19 is a diagram illustrating a display example 3 of the passage-allowed time region 111 according to this embodiment.

In FIG. 19, the passage-allowed time region 111 is displayed for each of mega-constellation business operators A and B.

High-precision forecast values of satellites constituting a mega-constellation is normally held only by the mega-constellation business operator concerned, so that it is difficult for third parties to share high-precision forecast values of a plurality of mega-constellation business operators.

According to the current outlook, the actual situation is that if orbital planes that are planned to be built in the Starlink concept by SPACE-X can be passed without any collision, a risk of colliding with satellites of a different mega-constellation in a launch is sufficiently small. However, in the future, a different mega-constellation business operator may build another mega-constellation in the vicinity of an altitude of 400 km. For this reason, the display example 3 of FIG. 19 is suitable for realizing a launch without colliding with any mega-constellation.

When a mega-constellation business operator, a rocket launch business operator, and a business operator that implements an assistance service by the rocket launch assistance device are from multiple countries, it is preferable to make it an international rule to disclose information on high-precision forecast values in the international coordination and space law development for avoiding collisions in space.

The display examples of the passage-allowed time region 111 of FIGS. 18 and 19 are an example, and any display format may be used as long as the passage-allowed time region 111 can be notified.

Description of Effects of this Embodiment

The rocket launch assistance device according to this embodiment can notify the rocket launch business operator of the passage-allowed time region of a rocket that is launched from the rocket lift-off site. If the time until reaching a specific altitude after the rocket is launched is used as a collateral condition and information on the passage-allowed time region is thus disclosed to the rocket launch business operator of the rocket lift-off site, the rocket can be launched with no collision risk.

Other Configurations

Variation 1

A rocket launch assistance system acquires space object information from a space information recorder to record space object information that is acquired from a management business device used by a management business operator that manages space objects. The rocket launch assistance system assists avoidance of a collision between a rocket being launched and a space object.

The rocket launch assistance system according to this embodiment includes a database to store space object information that is acquired from the space information recorder and a server to assist avoidance of a collision between a rocket being launched and a space object Specifically, the database may be a memory, an auxiliary storage device, or a file server. The space information recorder records space object information that is acquired by a management business device used by a management business operator that manages space objects. A rocket launch assistance device may include the space information recorder. Orbit forecast information may be included in the space information recorder.

Specifically, the server is the rocket launch assistance device. The database may be provided in the server, or may be a device different from the server. The server realizes the following phases (also referred to as means or units) by processing circuitry such as a processor or an electronic circuit.

The database acquires space object information of a rocket and orbit forecast information of a satellite group of a mega-constellation from the space information recorder and stores them. The space object information of the rocket is information that is acquired from a management business device of a rocket launch business operator by the space information recorder. The orbit forecast information of the satellite group of the mega-constellation is information that is acquired from a management business device of a mega-constellation with which the rocket has a risk of colliding. The space object information of the rocket includes location coordinates of a rocket lift-off site, information on a launch scheduled time of the rocket, and a forecast value of orbit information of the rocket. The forecast value of the orbit information of the rocket is referred to also as forecast orbit information of the rocket.

The server includes the following phases.

A phase of analyzing a delay time and an orbit location until the rocket that is launched from the location coordinates of the rocket lift-off site at the launch scheduled time reaches a vicinity of the mega-constellation;

A phase of determining a relative distance A between the rocket and another space object, the relative distance A serving as an index of a flight safety region;

A phase of determining a relative distance B between the rocket and another space object, the relative distance B serving as an index of a collision danger region;

A phase of extracting and identifying, as a caution-required satellite, each satellite that may come into a closer distance than the relative distance B among the mega-constellation satellite group;

A phase of extracting a safe time region in which all caution-required satellites simultaneously fly at a greater distance than the relative distance A;

A phase of displaying the safe time region;

A phase of displaying a safety confirmation message when the launch scheduled time of the rocket is included in the safe time region;

A phase of displaying a recommended launch time out of the safe time region as a launch time change recommendation message when the launch scheduled time of the rocket is not included in the safe time region; and A phase of notifying the rocket launch business operator of the safety confirmation message or the launch time change recommendation message.

The safe time region is an example of a time region without a collision risk.

Figure 26:
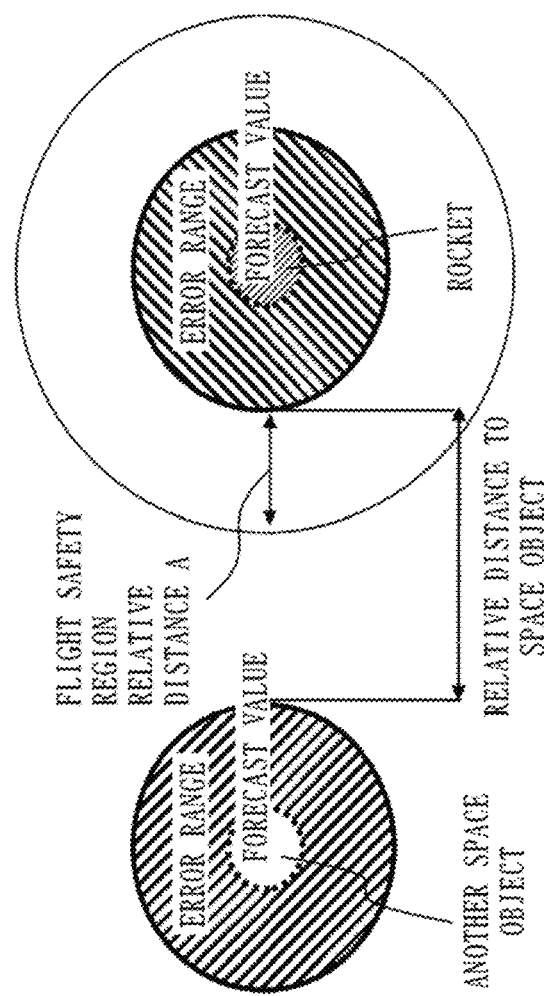
FIG. 26 is a diagram illustrating an example of a relative distance A between a rocket and another space object, which serves as an index of a flight safety region, according to a variation of Embodiment 1.

FIG. 26 is a diagram illustrating an example of the relative distance A between a rocket and another space object, which serves as an index of a flight safety region according to a variation of this embodiment.

Figure 27:
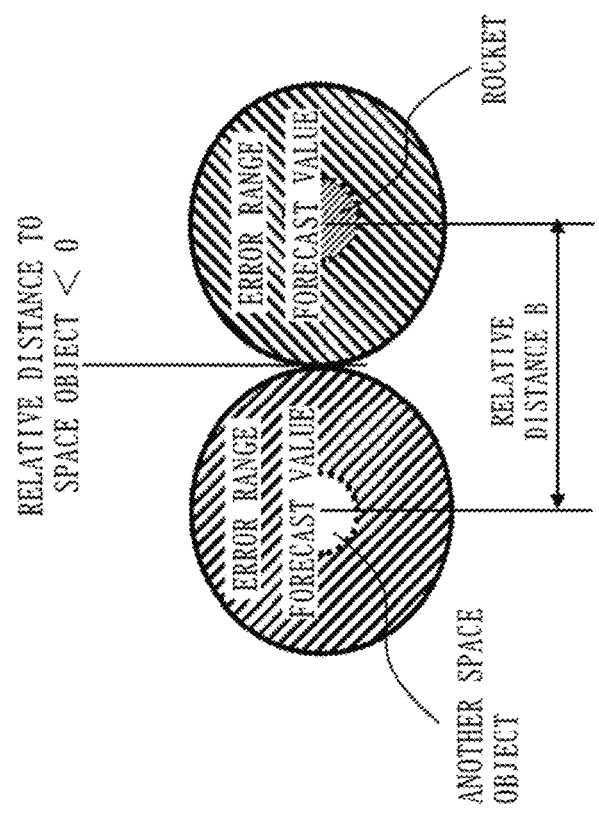
FIG. 27 is a diagram illustrating an example of a relative distance B between a rocket and another space object, which serves as an index of a collision danger region, according to a variation of Embodiment 1.

FIG. 27 is a diagram illustrating an example of the relative distance B between a rocket and another space object, which serves as an index of a collision danger region according to a variation of this embodiment.

As illustrated in FIG. 26, when the server determines the relative distance A between the rocket and another space object, which serves as the index for the flight safety region, it is necessary to include an error range in the size of the space object.

As illustrated in FIG. 27, when the server determines the relative distance B between the rocket and another space object, which serves as the index of the collision danger region, an actual relative distance in a case where the relative distance is 0 or less when the error range is included in the size of the space object is the relative distance B.

Figure 28:
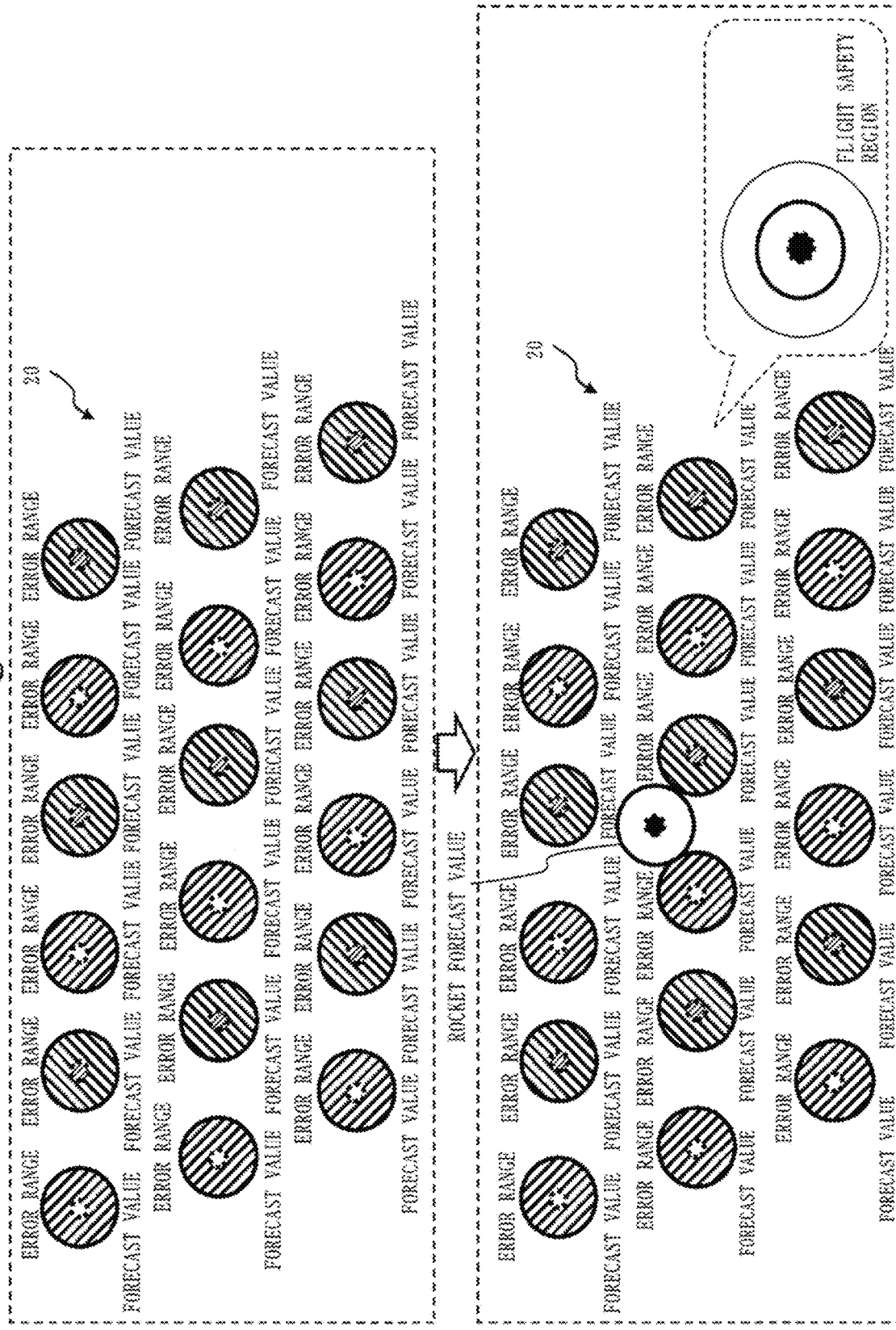
FIG. 28 is a diagram illustrating a state in which a flight safety region is not secured according to a variation of Embodiment 1.

FIG. 28 is a diagram illustrating a state in which a flight safety region is not secured according to a variation of this embodiment.

The upper part of FIG. 28 is a diagram in which a mega-constellation is modeled in two-dimensional space. The lower part of FIG. 28 indicates a state in which the relative distance between the rocket and a space object is almost 0 (because the object size is considered to include an error) and the flight safety region is not secured, although a collision is narrowly avoided.

Figure 29:
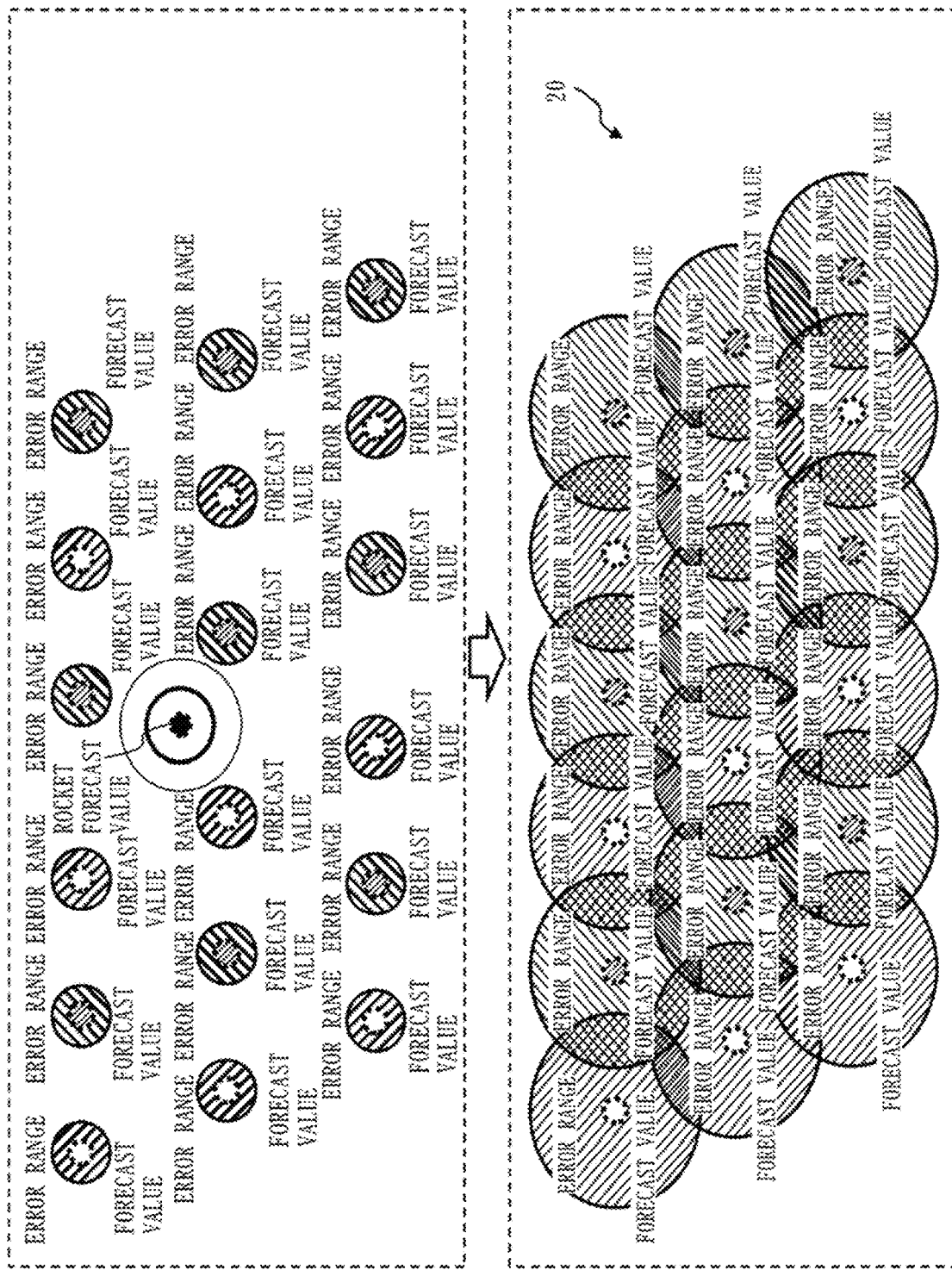
FIG. 29 is a diagram illustrating a state of a launch window depending on the size of an error range according to a variation of Embodiment 1.

FIG. 29 is a diagram indicating a state of a launch window depending on the size of an error range according to a variation of this embodiment.

The upper part of FIG. 29 is a diagram illustrating a state in which the flight safety region is secured according to this embodiment. Specifically, the upper part of FIG. 29 indicates a state in which the flight safety region of the rocket is secured in the mega-constellation business operator's own system. It may be possible to reduce the amount of error in the mega-constellation business operator's own system by using methods such as differential evaluation of inter-satellite distance measurement data or GPS measurement values and statistical data evaluation. Therefore, there is a high possibility that the flight safety region can be secured in the mega-constellation business operator's own system.

The lower part of FIG. 29 indicates a case in which precise forecast values of the mega-constellation are not disclosed and errors are large. When the mega-constellation business operator does not disclose the amount of error, forecast values of the mega-constellation depend on measurement information of an external source such as an SSA business operator. If the rocket launch business operator only knows forecast values with a large amount of error, there is a concern that a launch window cannot be secured. This means that if the rocket launch business operator and the mega-constellation business operator monopolize precise forecast values, there is a concern that the launch business will be monopolized.

Variation 2

In this embodiment, the functions of the rocket launch assistance device 100 are realized by software. As a variation, the functions of the rocket launch assistance device 100 may be realized by hardware.

Figure 20:
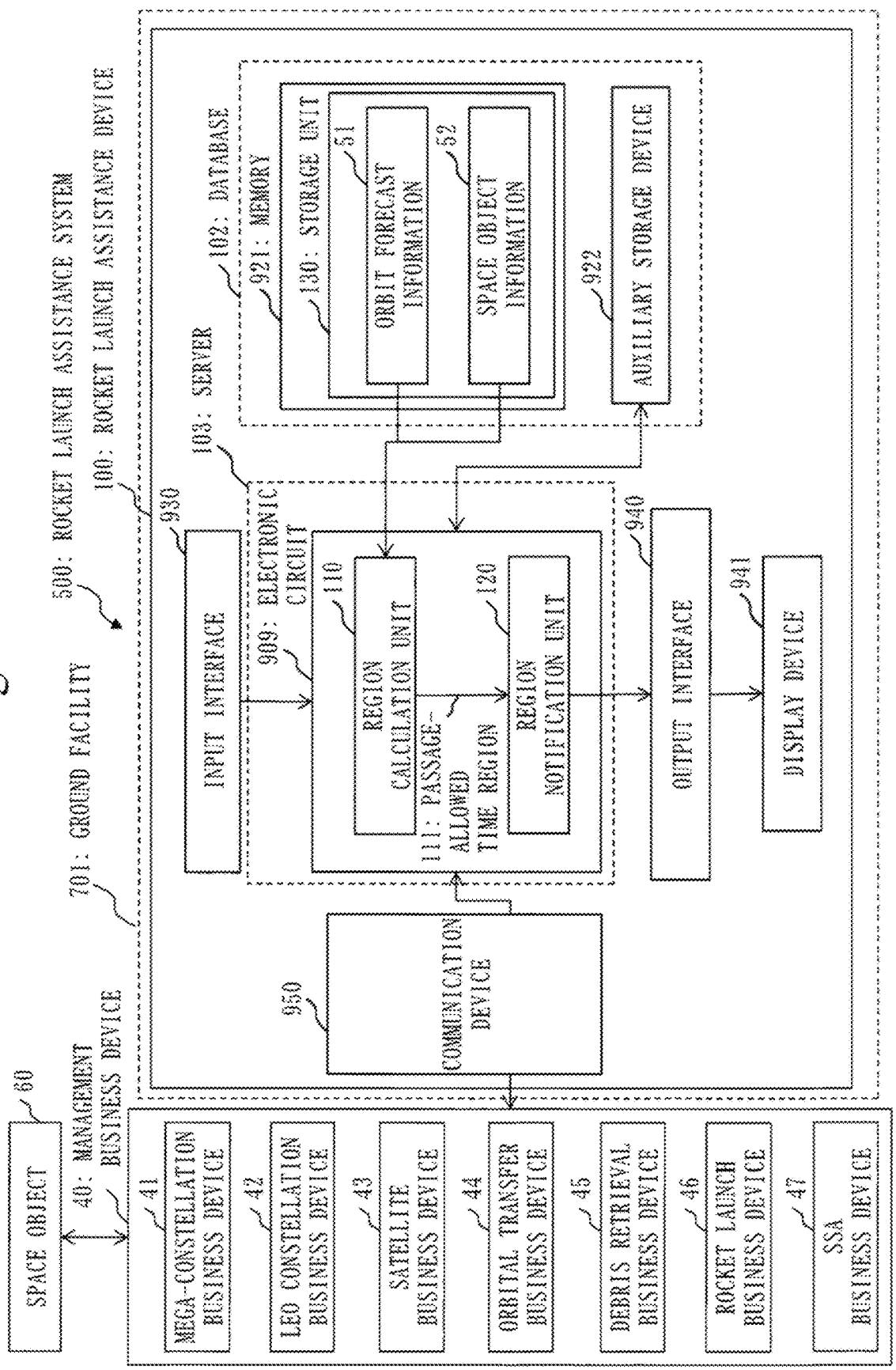
FIG. 20 is a diagram illustrating a configuration of the rocket launch assistance device according to a variation of Embodiment 1.

FIG. 20 is a diagram illustrating a configuration of the rocket launch assistance device 100 according to a variation of this embodiment.

The rocket launch assistance device 100 includes an electronic circuit 909 in place of the processor 910.

The electronic circuit 909 is a dedicated electronic circuit that realizes the functions of the rocket launch assistance device 100.

Specifically, the electronic circuit 909 is a single circuit, a composite circuit, a programmed processor, a parallel-programmed processor, a logic IC, a GA, an ASIC, or an FPGA. GA is an abbreviation for Gate Array.

The functions of the rocket launch assistance device 100 may be realized by one electronic circuit, or may be distributed among and realized by a plurality of electronic circuits.

As another variation, some of the functions of the rocket launch assistance device 100 may be realized by the electronic circuit, and the rest of the functions may be realized by software.

Each of the processor and the electronic circuit is also called processing circuitry. That is, the functions of the rocket launch assistance device 100 are realized by the processing circuitry.

Embodiment 2

In this embodiment, differences from Embodiment 1 will be mainly described. Components that have substantially the same functions as those in Embodiment 1 are denoted by the same reference signs and description thereof will be omitted.

Description of Configurations

Figure 21:
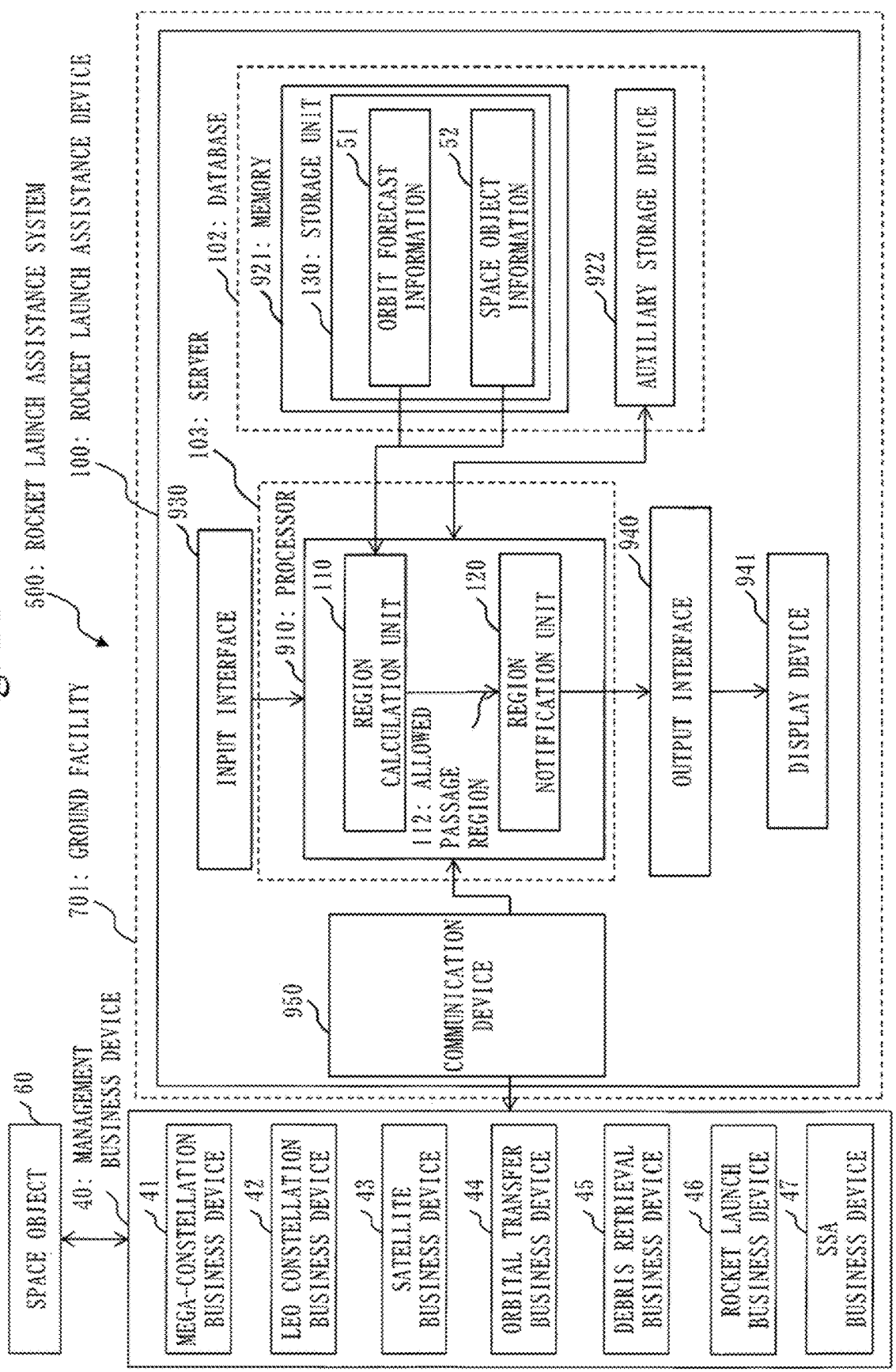
FIG. 21 is a configuration diagram of the rocket launch assistance device according to Embodiment 2.

FIG. 21 is a diagram illustrating a configuration of the rocket launch assistance device 100 according to this embodiment.

In this embodiment, the region calculation unit 110 calculates an allowed passage region 112. Then, the region notification unit 120 outputs the allowed passage region 112 calculated by the region calculation unit 110. Other configurations are substantially the same as those in Embodiment 1.

Description of Operation

Figure 22:
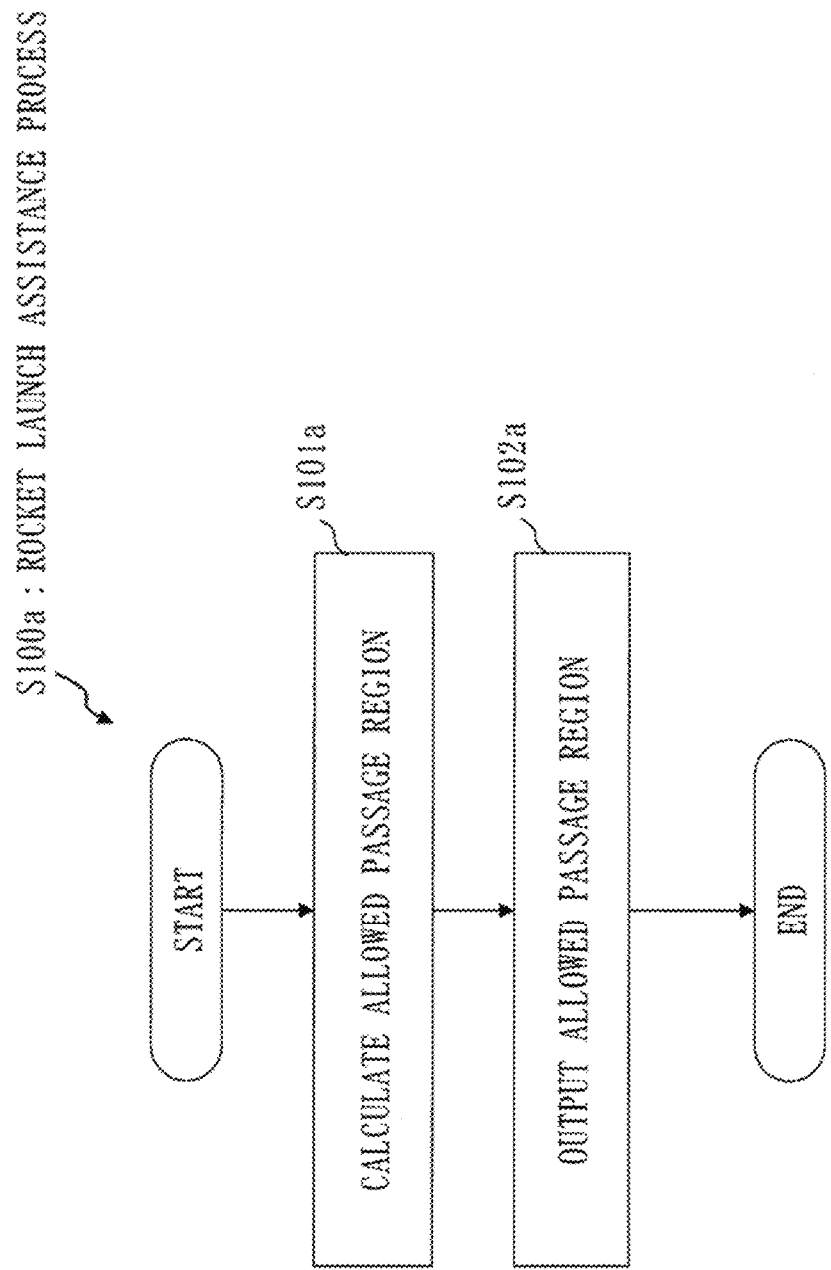
FIG. 22 is a flowchart of a rocket launch assistance process by the rocket launch assistance device according to Embodiment 2.

FIG. 22 is a flowchart of a rocket launch assistance process S100a by the rocket launch assistance device 100 according to this embodiment.

In step S101a, the region calculation unit 110 calculates the allowed passage region 112 based on the location coordinates of the rocket lift-off site 201 and the orbit forecast information 51 in which forecast values of the orbits of satellites are set. The allowed passage region 112 is a region in which there is no risk that the rocket 202 that is launched from the rocket lift-off site 201 may collide with satellites 30 of the satellite constellation 20 passing airspace above the rocket lift-off site 201.

In step S102a, the region notification unit 120 outputs the allowed passage region 112. For example, the region notification unit 120 displays the allowed passage region 112 on the display device 941 via the output interface 940. Alternatively, the region notification unit 120 notifies the management business device 40 or the launch control device 200 of the allowed passage region 112 via the communication device 950.

As a result, the launch control device 200 can launch the rocket 202 while avoiding a collision, using the allowed passage region 112.

Figure 23:
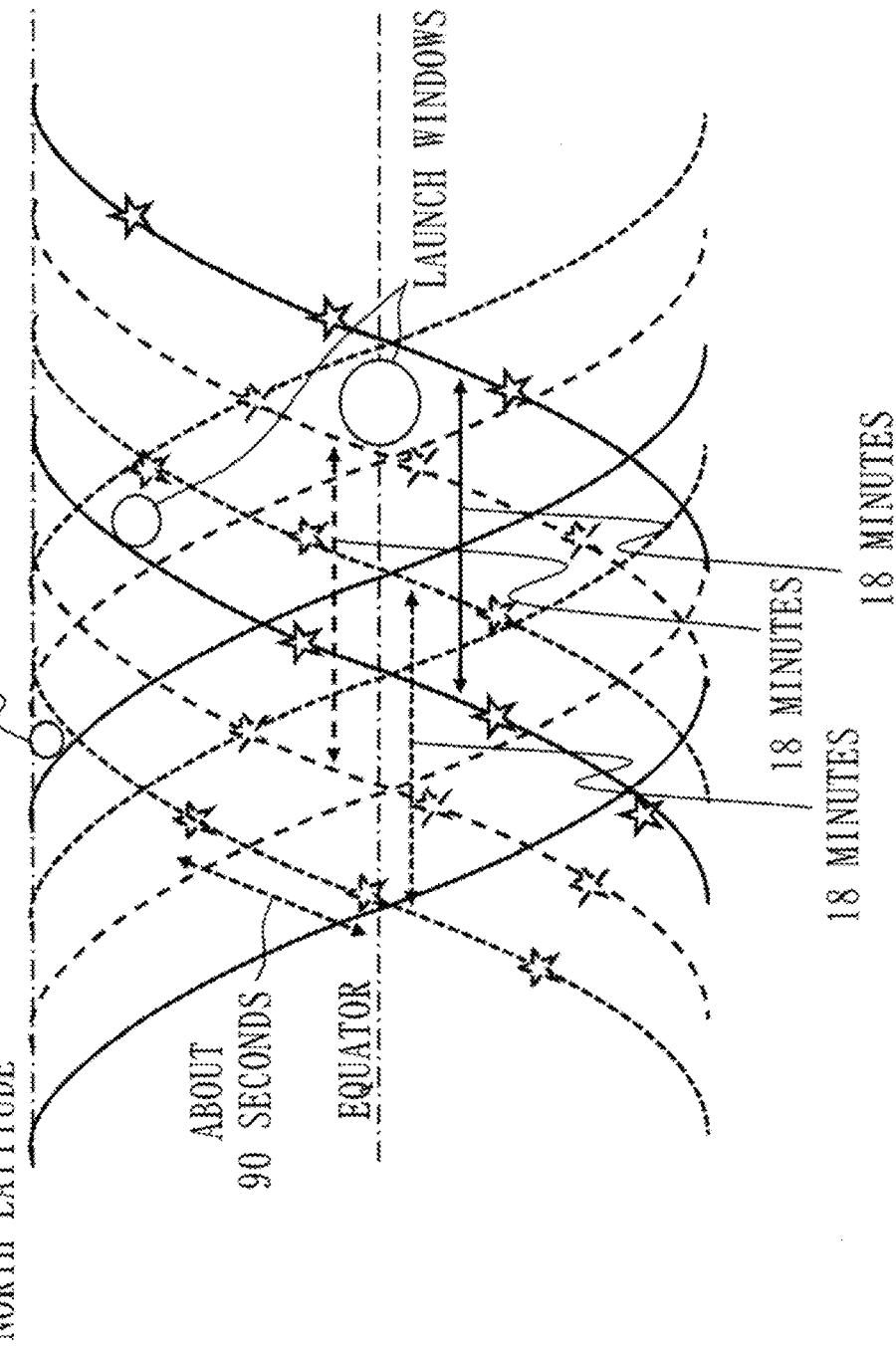
FIG. 23 is a satellite flight image in the vicinity of an orbital altitude of 340 km.
Figure 24:
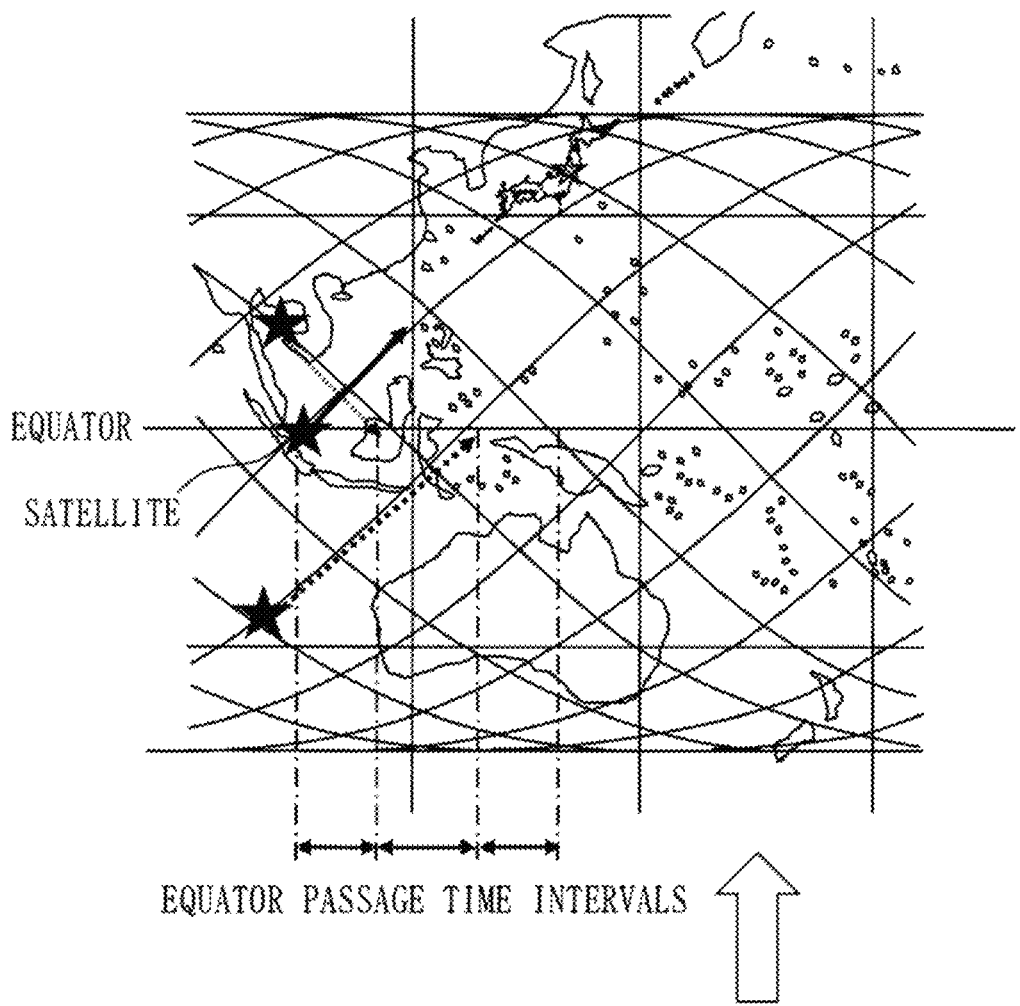
FIG. 24 is a diagram illustrating an example of a satellite constellation in the vicinity of an orbital altitude of 340 km.

FIG. 23 is a satellite flight image in the vicinity of an orbital altitude of 340 km. FIG. 24 is a diagram illustrating an example of a satellite constellation in the vicinity of an orbital altitude of 340 km.

Figure 25:
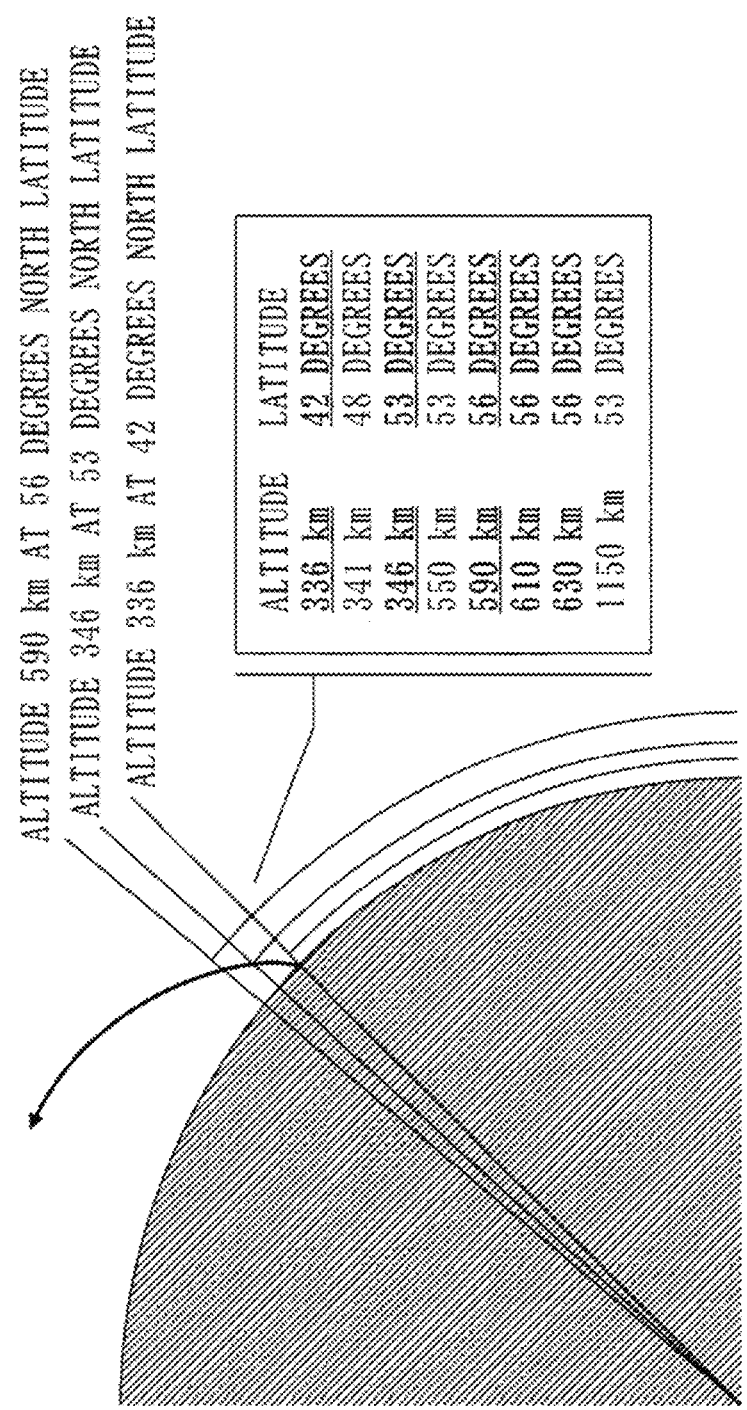
FIG. 25 is a diagram illustrating an example of a rocket launch.

FIG. 25 is a diagram illustrating an example of a rocket launch.

Referring to FIGS. 23 to 25, a specific example of a rocket launch will be described.

For example, the rocket 202 is launched from the rocket lift-off site 201 located at 40 or more degrees north latitude to the orbit at an orbital altitude of 300 km or higher and in a latitude direction of 50 or more degrees north latitude. That is, the launch control device 200 launches the rocket 202 from the rocket lift-off site 201 located at 40 or more degrees north latitude to the obit at an orbital altitude of 300 km or higher and in a latitude direction of 50 or more degrees north latitude.

As indicated in FIGS. 23 and 24, there is a plan to build a constellation of about 7500 satellites in the vicinity of an altitude of 340 km and at orbital inclinations of 50 or lower degrees. After the implementation of this plan is completed, there is a possibility that there may be no launch window for a launch to be made directly above or in a southward direction from a rocket lift-off site built in Hokkaido, for example.

A rocket that is launched from a rocket lift-off site at 40 or more degrees north latitude through an orbit at an orbital altitude 300 km or higher and in a high-latitude direction of 50 or more degrees north latitude will pass through a region near the pole where no mega-constellation is present, so that it can be launched safely without a collision risk.

At present, there is a concept to build a rocket lift-off site in Taiki town in Hokkaido at about 42 degrees north latitude. Mega-constellation concepts include a plan to operate about 2500 satellites in an inclined orbit at an altitude of about 340 km and an orbital inclination of 42 degrees. Since 42 degrees north latitude is a congested region where satellites turn, it is difficult to secure a launch window directly above. Furthermore, there is also a plan at an orbital inclination of 50 degrees, and it is extremely difficult to make a launch in a southward direction without colliding with these constellations.

Since the above constellation satellites are not present at 50 or more degrees north latitude, there is an effect that a launch can be made while avoiding a collision.

As illustrated in FIG. 25, when a launch is to be made from Taiki town at 42 degrees north latitude, the launch is possible without a risk of collision with a mega-constellation by taking a trajectory that passes through an altitude 336 km at 42 degrees north latitude, an altitude of 346 km at 53 degrees north latitude, or an altitude of 590 km at 56 degrees north latitude in a northward direction.

Description of Effects of this Embodiment

In the rocket launch assistance device according to this embodiment, a passage region where there is no risk that a rocket that is launched from a rocket lift-off site whose location coordinates are fixed and known may collide with satellites of a satellite constellation formed at a specific altitude is displayed as the allowed passage region. Therefore, there is an effect that the rocket launch business operator can perform a launch while avoiding a collision.

In Embodiments 1 and 2 above, business devices such as the following have been described.

A space information recorder is included in the database included in the rocket launch assistance device.

A space traffic management device includes the space information recorder, and assists avoidance of a collision between space objects flying in outer space. The space traffic management device is installed in each management business device 40 of a plurality of management business operators that manage space objects flying in space. For example, the space traffic management device is installed in devices such as the mega-constellation business device 41, the LEO constellation business device 42, the satellite business device 43, the orbital transfer business device 44, the debris retrieval business device 45, the rocket launch business device 46, and the SSA business device 47.

An SSA business device (space situational awareness business device) performs space situational awareness (SSA), and also serves as the rocket launch assistance device. The SSA business device (space situational awareness business device) assists avoidance of a collision between a rocket and each satellite of a mega-constellation satellite group.

A mega-constellation business device also serves as the rocket launch assistance device, and assists avoidance of a collision between a rocket and each satellite of a mega-constellation satellite group.

A mega-constellation business device also serves as the rocket launch assistance device, and performs operational control of an action to avoid a collision between a rocket and each satellite of a mega-constellation satellite group.

Embodiment 3

In this embodiment, differences from Embodiments 1 and 2 and additions to Embodiments 1 and 2 will be mainly described.

In this embodiment, components that have substantially the same functions as those in Embodiments 1 and 2 are denoted by the same reference signs and description thereof will be omitted.

The emergence of mega-constellation business operators causes a situation where about 50000 satellites fly comprehensively in the sky at orbital altitudes of 340 km to 1300 km, and it is extremely difficult to secure flight safety in a rocket launch. It is difficult for a single business operator to collect real-time high-precision orbit information of mega-constellation satellite groups. Therefore, a procedure is established in which the usability of orbit information is enhanced by a combination of quasi-real-time high-precision orbit information of a representative satellite and relative orbit information of other constituent elements, and a rocket launch timing is analytically derived. There is a high risk of a collision between a satellite in the process of deorbiting from a high altitude and a satellite at a low altitude, between a satellite at a low altitude and a newly launched rocket, or between satellites during geostationary orbital transfers. Furthermore, there is a risk of an unexpected collision as a result of collision avoidance operations that are taken by both parties at the same time. In this embodiment, a device that displays satellite information of mega-constellations and assists collision avoidance in a rocket launch will be described.

Consideration is being given to construction of a public information system called an open architecture data repository (OADR) so as to share information among business operators and secure fight safety for space objects.

In this embodiment, an arrangement in which flight safety of space objects is secured by a public information system called an OADR will be described.

When the OADR is constructed as a public institution for international cooperation, an authority for issuing an instruction or a request across a national border may be given to a business operator.

For example, to centrally manage orbit information of space objects held by business operators around the world, it is rational if an instruction or request to provide orbit information to the OADR can be made under rules based on an international consensus.

When a particular country constructs the OADR as a public institution, an authority to issue an instruction or request may be given to a business operator in the country concerned.

It may be arranged such that information is disclosed unconditionally to business operators of the country concerned and information is disclosed conditionally to other business operators.

As disclosure conditions, a payment requirement, a fee setting, a restriction of disclosed items, a restriction of precision of disclosed information, a restriction of disclosure frequency, non-disclosure to a specific business operator, and so on may be set.

For example, a difference between free and chargeable or a difference in fee for acquiring information may arise between the country concerned and other countries, and the setting of disclosure conditions by the OADR will have influence in creating a system of space traffic management or in terms of industrial competitiveness.

It is rational that confidential information on space objects that contributes to security is held by the OADR constructed as a public institution by a nation and is not disclosed to third parties. For this reason, the OADR may include a database to store non-public information in addition to a database for the purpose of information disclosure.

Space object information held by a private business operator includes information that cannot be disclosed generally due to corporate secrets or the like. There is also information that is not appropriate to be disclosed generally because of a huge amount of information or a high update frequency due to constant maneuver control.

When danger analysis and analytical evaluation related to proximities or collisions between space objects are to be performed, it is necessary to take into account orbit information of all space objects regardless of whether or not space objects require confidentiality. For this reason, it is rational that the OADR as a public institution carries out danger analysis taking confidential information into account, and discloses information conditionally by restricting a disclosure recipient or disclosure content if danger is foreseen as a result of analytical evaluation. For example, it is rational to process information to allow disclosure and then disclose the information by restricting a disclosure recipient or disclosure content, such as disclosing only orbit information of a time period with danger to a disclosure recipient that will contribute to avoiding the danger.

If the number of objects in orbit increases and the risk of proximity or collision increases in the future, various danger avoidance measures will be necessary, such as means by which a debris removal business operator removes dangerous debris or means by which a mega-constellation business operator changes an orbital location or passage timing to avoid a collision. If the OADR that is a public institution can instruct or request a business operator to execute a danger avoidance action, a significant effect can be expected in securing flight safety in space.

There are space objects that are managed by an institution such as a venture business operator in an emerging country or a university that has little experience in space business and lacks information that contributes to danger avoidance. If it is foreseen that a space object managed by such an institution that has little experience in space business and lacks information that contributes to danger avoidance will intrude into an orbital altitude zone in which a mega-constellation flies, danger avoidance can be effected promptly and effectively by the OADR acting as an intermediary to transmit information to business operators as required.

In addition, by executing a danger avoidance measure or by interceding for or introducing space insurance for private business operators, contribution can be made to the promotion and industrialization of space traffic management.

Arrangements for realizing the OADR include the following arrangements.

An arrangement that includes only a public database.

An arrangement that has danger analysis means, collision avoidance assistance means, or space situational awareness (SSA) means, and independently contributes to danger avoidance.

An arrangement that makes an instruction or request to a business operator or performs intercession or introduction for a business operator, and contributes to danger avoidance by information management.

As arrangements for realizing the OADR, there are also various possibilities other than the above arrangements.

Note that "the OADR intercedes for implementation of a method" means, for example, a case in which the entities that implement the method such as the rocket launch assistance method are external business devices other than the OADR, and the OADR mediates between the business devices to prompt the implementation instead of forcibly ordering it. That "the OADR intercedes for implementation of a method" is rephrased, for example, as "the OADR mediates so that external business devices other than the OADR cooperatively implement a method". Alternatively, "mediates" may be replaced with "provides direction".

Configuration examples of the OADR according to this embodiment will be described below.

Configuration Example 1 of the OADR

Figure 30:
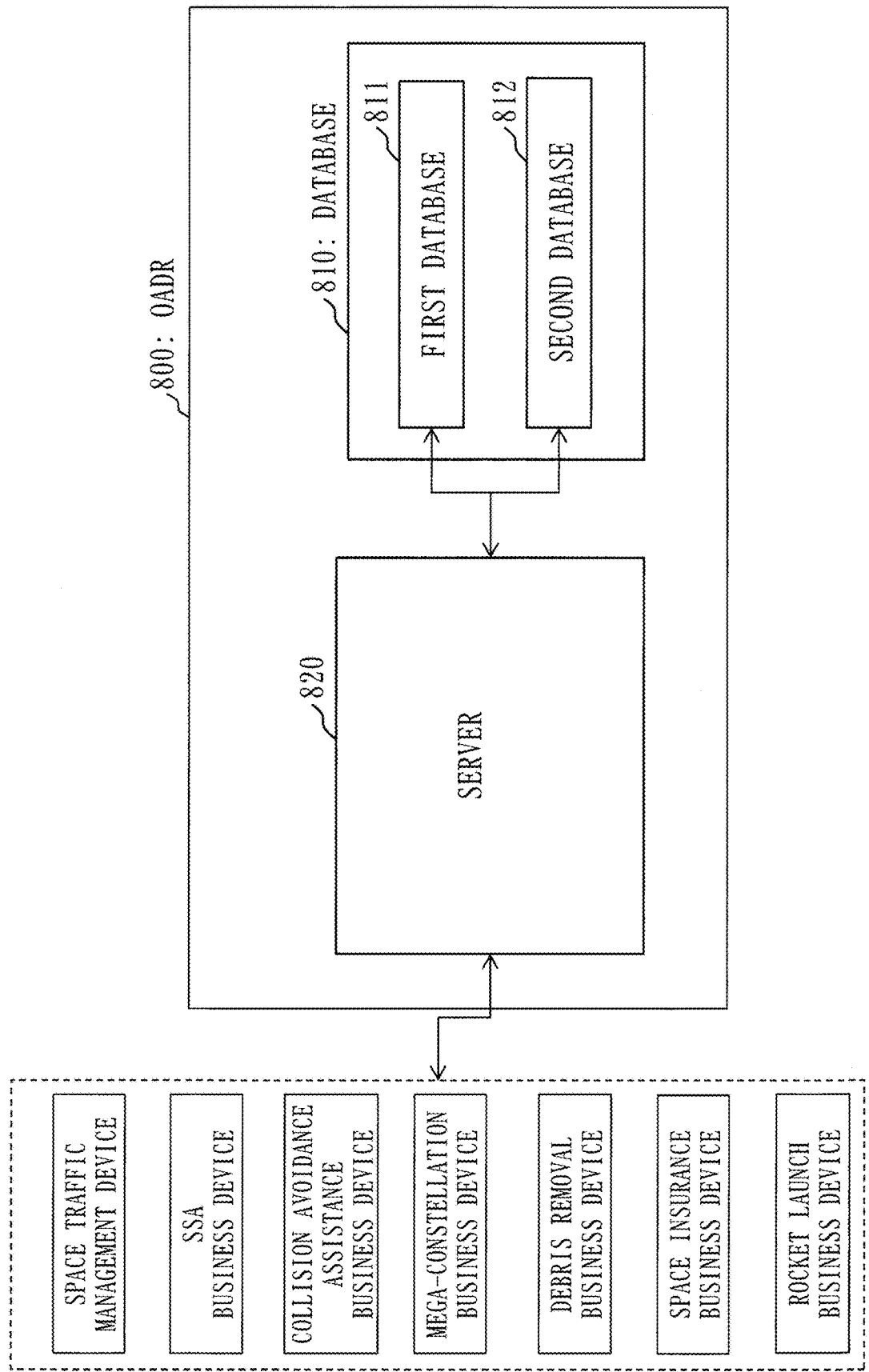
FIG. 30 is an example of a functional configuration of an OADR according to Embodiment 3.

FIG. 30 is Configuration Example 1 of an OADR 800 according to this embodiment.

The OADR 800 is a public information system that discloses orbit information of a space object. The OADR 800 includes a database 810 to store orbit information of space objects and a server 820.

The database 810 includes a first database 811 to store pubic information and a second database 812 to store non-public information.

The server 820 acquires space object information including non-public information from all or at least one of a space traffic management device, an SSA business device (space situational awareness business device), a collision avoidance assistance business device, a mega-constellation business device, and a debris removal business device, and stores the space object information in the second database 812. The space traffic management device is provided in the CSpOC, for example.

The CSpOC of the United States has not so far been equipped with a bidirectional line and has unidirectionally notified danger alerts. If the CSpOC is equipped with a space traffic management device, the space traffic management device allows contribution to be made to space traffic management through a bidirectional communication line with other business devices.

The server 820 generates conditional public information for which a disclosure recipient and disclosure content are restricted and stores the conditional public information in the first database 811.

The server 820 transmits the conditional public information to only a specific business device among the SSA business device, the collision avoidance assistance business device, the mega-constellation business device, the debris removal business device, and a space insurance business device that handles space insurance.

The OADR 800 of Configuration Example 1 realizes the above-described functions and also intercedes for implementation of the rocket launch assistance method described in Embodiments 1 and 2.

Confidential information on space objects that is held by the CSpOC and contributes to security may be disclosed only to the OADR. A proximity or collision risk needs to be analyzed and foreseen by taking confidential information into account.

Confidential information is processed into information that can be disclosed conditionally and then conditional public information that contributes to collision avoidance assistance is shared with only a business device involved in a collision risk. This allows even a private business operator to carry out a collision avoidance action.

In addition, with regard to space object information held by private business operators, if the OADR similarly processes space object information that cannot be generally disclosed into information that can be disclosed conditionally, collision avoidance becomes possible.

Configuration Example 2 of the OADR

Figure 31:
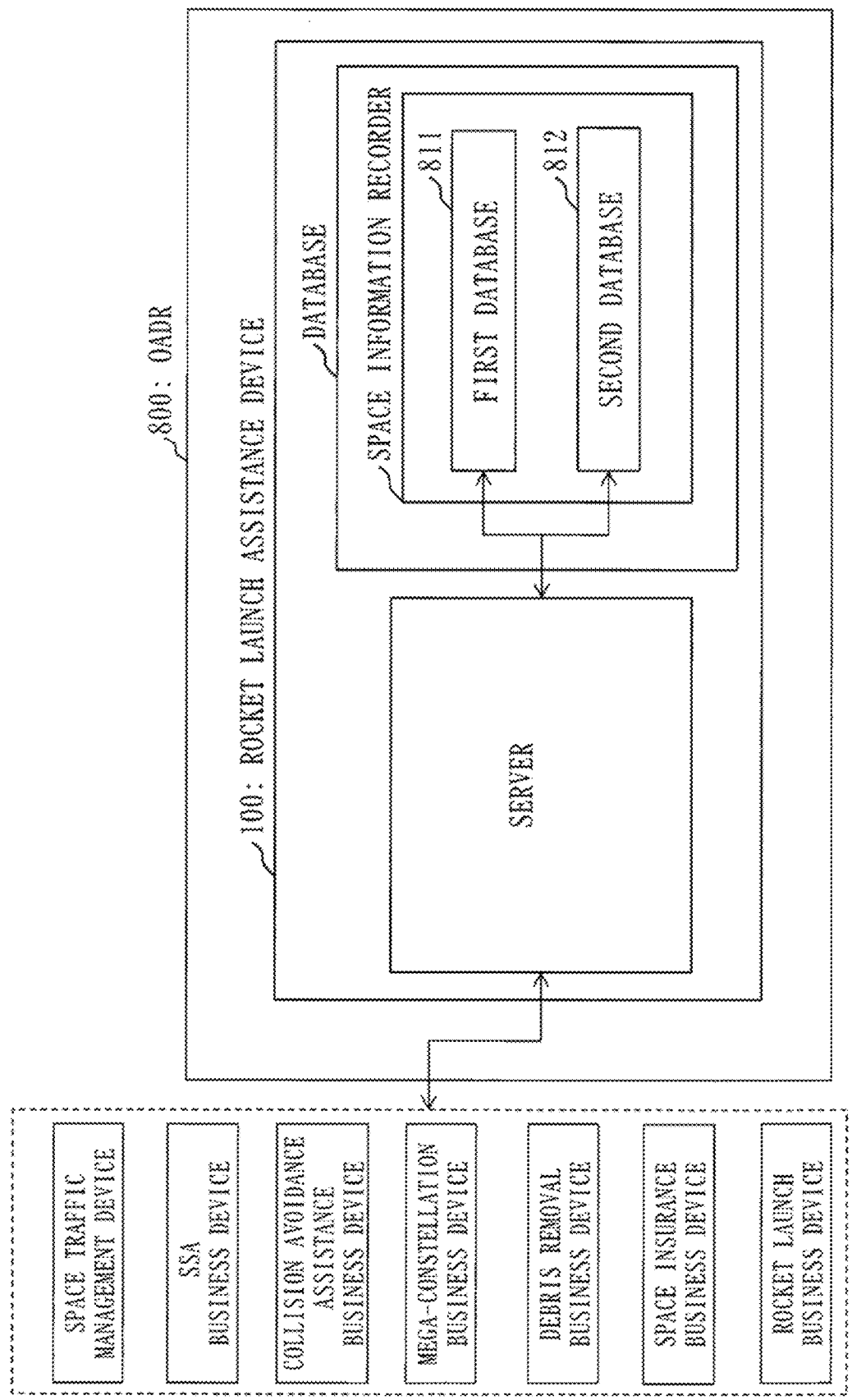
FIG. 31 is an example of the functional configuration of the OADR according to Embodiment 3.

FIG. 31 is Configuration Example 2 of the OADR 800 according to this embodiment.

Configuration Example 2 of the OADR 800 includes the rocket launch assistance device 100 described in Embodiments 1 and 2.

The rocket launch assistance device 100 includes the server and the database. As described in Embodiment 2, the space information recorder is stored in the database included in the rocket launch assistance device 100.

The space information recorder includes a first database 811 to store public information and a second database 812 to store non-public information.

The server acquires space object information including non-public information from all or at least one of a space traffic management device, an SSA business device, a collision avoidance assistance business device, a rocket launch business device, a mega-constellation business device, and a debris removal business device, and stores the space object information in the second database 812. The space traffic management device is installed in the CSpOC, for example.

The server generates conditional public information for which a disclosure recipient and disclosure content are restricted and stores the conditional public information in the first database 811.

The server transmits the conditional public information only to a specific business device among the SSA business device, the collision avoidance assistance business device, the rocket launch business device, the mega-constellation business device, the debris removal business device, and a space insurance business device that handles space insurance.

By arranging that the OADR includes the rocket launch assistance device as in Configuration Example 2, substantially the same effects as those of Configuration Example 1 can be obtained.

In Embodiments 1 to 3 above, each unit of the rocket launch assistance device has been described as an independent functional block. However, the configuration of the rocket launch assistance device may be different from the configurations described in the above embodiments. The functional blocks of the rocket launch assistance device may be arranged in any configuration, provided that the functions described in the above embodiments can be realized. The rocket launch assistance device may be a single device or a system composed of a plurality of devices.

Portions of Embodiments 1 to 3 may be implemented in combination. Alternatively, one portion of these embodiments may be implemented. These embodiments may be implemented as a whole or partially in any combination.

That is, portions of Embodiments 1 to 3 may be freely combined. Alternatively, in Embodiments 1 to 3, any modification may be made to constituent elements. That is, in Embodiments 1 to 3, any constituent element may be added or omitted.

The embodiments described above are essentially preferable examples and are not intended to limit the scope of the present disclosure, the scope of applications of the present disclosure, and the scope of uses of the present disclosure. The embodiments described above can be modified in various ways as necessary.

REFERENCE SIGNS LIST

20: satellite constellation; 21: orbital plane; 30: satellite; 31: satellite control device; 32: satellite communication device; 33: propulsion device; 34: attitude control device; 35: power supply device; 40: management business device; 41: mega-constellation business device; 42: LEO constellation business device; 43: satellite business device; 44: orbital transfer business device; 45: debris retrieval business device; 46: rocket launch business device; 47: SSA business device; 51: orbit forecast information; 52: space object information; 511, 521: space object ID; 512: forecast epoch; 513: forecast orbital elements; 514: forecast error; 60: space object; 70: Earth; 100: rocket launch assistance device; 101: space information recorder; 103: server; 102: database; 110: region calculation unit; 111: passage-allowed time region; 112: allowed passage region; 120: region notification unit; 130: storage unit; 55: orbit control command; 200: launch control device; 201: rocket lift-off site; 202: rocket; 600: satellite constellation forming system; 11, 11b: satellite constellation forming unit; 300: satellite group; 301: mega-constellation satellite group; 331: representative satellite; 332: constituent satellite; 700, 701, 702: ground facility; 500: rocket launch assistance system; 510: orbit control command generation unit; 520: analytical prediction unit; 909: electronic circuit; 910: processor; 921: memory; 922: auxiliary storage device; 930: input interface; 940: output interface; 941: display device; 950: communication device; Ox: rocket launch prediction value; 800: OADR; 810: database; 811: first database; 812: second database; 820: server.

The invention claimed is:

1. A rocket launch assistance device to avoid a collision between each satellite of a mega-constellation satellite group constituting a mega-constellation, which is a satellite constellation composed of 100 or more satellites, and a rocket that is launched from a rocket lift-off site, the rocket launch assistance device comprising:
    a database to store orbit forecast information of the mega-constellation satellite group that is acquired from a space information recorder that is included in a mega-constellation business device used by a mega-constellation business operator that manages the mega-constellation, and space object information of the rocket that is acquired from a rocket launch business device used by a rocket launch business operator that launches the rocket and includes location coordinates of the rocket lift-off site, information on a launch scheduled time of the rocket, and a forecast value of orbit information of the rocket; and
    a server to assist avoidance of a collision between the rocket that is launched from the rocket lift-off site and each satellite of the mega-constellation satellite group passing airspace above the rocket lift-off site, based on the orbit forecast information of the mega-constellation satellite group and the space object information of the rocket,
    wherein the orbit forecast information of the mega-constellation satellite group is composed of a real-time prediction value of an orbit of at least one representative satellite out of the mega-constellation satellite group flying at a same orbital altitude and a real-time prediction value of an orbit of a constituent satellite other than the representative satellite, the real-time prediction value of the orbit of the constituent satellite being a value relative to the real-time prediction value of the orbit of the representative satellite, and
    the rocket launch business device is notified of an allowed passage region through which the rocket may be launched to cause the rocket launch business device to control the launch of the rocket through the allowed passage region.

2. The rocket launch assistance device according to claim 1, wherein the server includes processing circuitry configured to:
analyze a delay time and an orbit location until the rocket that is launched from the location coordinates of the rocket lift-off site at the launch scheduled time reaches a vicinity of the mega-constellation,
determine a relative distance A between the rocket and another space object, the relative distance A serving as an index of a flight safety region,
determine a relative distance B between the rocket and another space object, the relative distance B serving as an index of a collision danger region,
extract and identify, as a caution-required satellite, each satellite that may come into a proximity at a closer distance than the relative distance B from among the mega-constellation satellite group,
extract a safe time region in which all caution-required satellites simultaneously fly at a greater distance than the relative distance A,
display the safe time region,
display a safety confirmation message when the launch scheduled time of the rocket is included in the safe time region,
display a recommended launch time out of the safe time region as a launch time change recommendation message when the launch scheduled time of the rocket is not included in the safe time region, and
notify the rocket launch business operator of the safety confirmation message or the launch time change recommendation message.

3. The rocket launch assistance device according to claim 1, wherein the server includes processing circuitry to:
calculate, as a passage-allowed time region, a time region in which there is no risk that the rocket that is launched from the rocket lift-off site may collide with each satellite of the mega-constellation satellite group passing airspace above the rocket lift-off site, based on the location coordinates of the rocket lift-off site and the orbit forecast information of the mega-constellation satellite group, and
output the passage-allowed time region.

4. The rocket launch assistance device according to claim 3,
wherein the processing circuitry acquires a rocket launch prediction value, which is a prediction value of passage of an orbit of the mega-constellation by the rocket that is launched from the rocket lift-off site, and calculates the passage-allowed time region using the rocket launch prediction value.

5. The rocket launch assistance device according to claim 3,
wherein the mega-constellation is a plurality of mega-constellations that are formed at a plurality of orbital altitudes that are mutually different, and
wherein the processing circuitry calculates the passage-allowed time region for each of the plurality of orbital altitudes, and
outputs a time region obtained by integrating a plurality of passage-allowed time regions that are calculated respectively for the plurality of orbital altitudes.

6. The rocket launch assistance device according to claim 3,
wherein the mega-constellation is a plurality of mega-constellations that are operated by a plurality of mega-constellation business operators that are mutually different, and
wherein the processing circuitry calculates the passage-allowed time region for each of the plurality of mega-constellations, and
outputs the passage-allowed time region for each of the plurality of mega-constellations.

7. The rocket launch assistance device according to claim 1, wherein the server includes processing circuitry to:
calculate, as an allowed passage region, a passage region in which there is no risk that the rocket that is launched from the rocket lift-off site may collide with the mega-constellation satellite group passing airspace above the rocket lift-off site, based on the location coordinates of the rocket lift-off site and the orbit forecast information of the mega-constellation satellite group, and
output the allowed passage region.

8. A rocket launch assistance system comprising a mega-constellation business device used by a mega-constellation business operator that manages a mega-constellation, which is a satellite constellation composed of 100 or more satellites; a rocket launch business device used by a rocket launch business operator that launches a rocket from a rocket lift-off site; and a rocket launch assistance device that avoids a collision between each satellite of a mega-constellation satellite group constituting the mega-constellation and the rocket that is launched from the rocket lift-off site,
wherein the rocket launch assistance device includes
a database to store orbit forecast information of the mega-constellation satellite group that is acquired from a space information recorder included in the mega-constellation business device, and space object information of the rocket that is acquired from the rocket launch business device and includes location coordinates of the rocket lift-off site, launch scheduled time information of the rocket, and a forecast value of orbit information of the rocket, and
a server to assist avoidance of a collision between the rocket that is launched from the rocket lift-off site and each satellite of the mega-constellation satellite group passing airspace above the rocket lift-off site, based on the orbit forecast information of the mega-constellation satellite group and the space object information of the rocket, and
wherein the orbit forecast information of the mega-constellation satellite group is composed of a real-time prediction value of an orbit of at least one representative satellite out of the mega-constellation satellite group flying at a same orbital altitude and a real-time prediction value of an orbit of a constituent satellite other than the representative satellite, the real-time prediction value of the orbit of the constituent satellite being a value relative to the real-time prediction value of the orbit of the representative satellite, and
the rocket launch business device is notified of an allowed passage region through which the rocket may be launched to cause the rocket launch business device to control the launch of the rocket through the allowed passage region.

9. A rocket launch assistance method of a rocket launch assistance device to avoid a collision between each satellite of a mega-constellation satellite group constituting a mega-constellation, which is a satellite constellation composed of 100 or more satellites, and a rocket that is launched from a rocket lift-off site, the rocket launch assistance method comprising:

storing, in a database, orbit forecast information of the mega-constellation satellite group that is acquired from a space information recorder that is included in a mega-constellation business device used by a mega-constellation business operator that manages the mega-constellation, and space object information of the rocket that is acquired from a rocket launch business device used by a rocket launch business operator that launches the rocket and includes location coordinates of the rocket lift-off site, information on a launch scheduled time of the rocket, and a forecast value of orbit information of the rocket; and assisting avoidance of a collision between the rocket that is launched from the rocket lift-off site and each satellite of the mega-constellation satellite group passing airspace above the rocket lift-off site, based on the orbit forecast information of the mega-constellation satellite group and the space object information of the rocket, wherein the orbit forecast information of the mega-constellation satellite group is composed of a real-time prediction value of an orbit of at least one representative satellite out of the mega-constellation satellite group flying at a same orbital altitude and a real-time prediction value of an orbit of a constituent satellite other than the representative satellite, the real-time prediction value of the orbit of the constituent satellite being a value relative to the real-time prediction value of the orbit of the representative satellite, and the rocket launch business device is notified of an allowed passage region through which the rocket may be launched to cause the rocket launch business device to control the launch of the rocket through the allowed passage region.

10. A space information recorder that is stored in the database included in the rocket launch assistance device according to claim 1.

11. A space traffic management device comprising the space information recorder according to claim 10 and assisting avoidance of a collision between space objects flying in outer space.

12. The rocket launch assistance device according to claim 1, wherein the rocket launch assistance device is included in a space situational awareness business device that performs space situational awareness (SSA) and that assists in avoidance of a collision between a rocket and each satellite of a mega-constellation satellite group.

13. A mega-constellation business device that also functions as the rocket launch assistance device according to claim 1, and assists avoidance of a collision between a rocket and each satellite of a mega-constellation satellite group.

14. A mega-constellation business device that also functions as the rocket launch assistance device according to claim 1, and performs operational control of an action to avoid a collision between a rocket and each satellite of a mega-constellation satellite group.

15. The rocket launch assistance device according to claim 1, wherein the rocket launch assistance device is included in an open architecture data repository (OADR) that discloses orbit information of a space object, the rocket launch assistance device including a space information recorder, which is a database to store orbit information of a space object, a server, wherein the space information recorder includes a first database to store public information and a second database to store non-public information, wherein the server acquires space object information including non-public information from all or at least one of a space traffic management device that manages space traffic, a space situational awareness business device that monitors a space situation, a collision avoidance assistance business device that assists avoidance of a collision between space objects in space, a rocket launch business device used by a rocket launch business operator that conducts a rocket launch business, a mega-constellation business device that manages a mega-constellation, and a debris removal business device that assists removal of debris, and stores the space object information in the second database, generates conditional public information for which a disclosure recipient and disclosure content are restricted, and stores the conditional public information in the first database, and transmits the conditional public information only to a specific business device among the space situational awareness business device, the collision avoidance assistance business device, the rocket launch business device, the mega-constellation business device, the debris removal business device, and a space insurance business device that handles space insurance.

16. The rocket launch assistance method according to claim 9, further comprising:

disclosing, by an open architecture data repository (OADR) comprising a database to store orbit information of a space object and a server, orbit information of a space object, including, in the database, a first database to store public information and a second database to store non-public information, acquiring, by the server, space object information including non-public information from all or at least one of a space traffic management device that manages space traffic, a space situational awareness business device that monitors a space situation, a collision avoidance assistance business device that assists avoidance of a collision between space objects in space, a mega-constellation business device that manages a mega-constellation, and a debris removal business device that assists removal of debris, and stores the space object information in the second database, generating, by the server, conditional public information for which a disclosure recipient and disclosure content are restricted, and storing the conditional public information in the first database, and transmitting, by the server, the conditional public information only to a specific business device among the space situational awareness business device, the collision avoidance assistance business device, the mega-constellation business device, the debris removal business device, and a space insurance business device that handles space insurance.

\* \* \* \* \*